United States Patent
Ebisawa et al.

(10) Patent No.: US 6,876,732 B2
(45) Date of Patent: *Apr. 5, 2005

(54) SERVICE PROVIDING METHOD FOR ELECTRONIC DEVICE, CUSTOMER CENTER, AND USER SYSTEM

(75) Inventors: Yoshimitsu Ebisawa, Musashino (JP); Seiichi Yamamoto, Sagamihara (JP); Hitoshi Kato, Sagamihara (JP); Yoshihiro Kawauchi, Hachioji (JP); Yasuo Funato, Hachioji (JP); Takeshi Makita, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 10/106,357

(22) Filed: Mar. 27, 2002

(65) Prior Publication Data

US 2002/0168059 A1 Nov. 14, 2002

(30) Foreign Application Priority Data

Mar. 28, 2001 (JP) ........................................ 2001-094161

(51) Int. Cl.[7] ................................................ H04M 1/00
(52) U.S. Cl. ...................... 379/156; 379/165; 379/9.04; 379/201.12
(58) Field of Search ............................... 379/9.01, 9.02, 379/9.04, 14, 15.01, 29.09, 156, 165, 201.03, 201.05, 201.12, 203.01, 204.01, 198; 705/1, 21

(56) References Cited

U.S. PATENT DOCUMENTS

| | | | | |
|---|---|---|---|---|
| 4,972,453 A | * | 11/1990 | Daniel et al. | 379/9.03 |
| 5,691,973 A | * | 11/1997 | Ramstrom et al. | 379/252 |
| 6,055,227 A | * | 4/2000 | Lennert et al. | 370/254 |
| 6,597,666 B1 | * | 7/2003 | Hemzal et al. | 370/254 |
| 2002/0080931 A1 | * | 6/2002 | Yamamoto et al. | 379/90.01 |
| 2002/0168059 A1 | * | 11/2002 | Ebisawa et al. | 379/156 |

FOREIGN PATENT DOCUMENTS

| | | |
|---|---|---|
| DE | 195 04 076 | 8/1996 |
| GB | 2 271 250 | 4/1994 |
| JP | 6-284201 | 10/1994 |
| JP | 2000-354120 | 12/2000 |
| WO | WO 98/05152 | 2/1998 |

* cited by examiner

Primary Examiner—Quoc Tran
(74) Attorney, Agent, or Firm—Finnegan, Henderson, Farabow, Garrett & Dunner, L.L.P.

(57) ABSTRACT

Upon providing a new service associated with a key telephone unit to an user system, a customer center periodically acquires communication log information of the key telephone unit, generates suggestion information of an inside comprise, which is optimal to the key telephone unit, on the basis of the communication log information, and automatically transmits that suggestion information to a maintenance personal computer via the Internet.

76 Claims, 36 Drawing Sheets

| Conversation start time | Conversation end time | Destination dial | Call originating trunk | Trunk ready wait time |
|---|---|---|---|---|
| 19:30 | 19:45 | 042-585-3690 | Trunk 5 | 3S |
| 21:00 | 21:30 | 042-599-9901 | Trunk 4 | 0S |
| 21:00 | Not established | Not established | Trunk 4 | 10S |
|  |  |  |  |  |
|  |  |  |  |  |

FIG. 4

| Conversation start time | Conversation end time | Call receiving trunk | Call receiving extension | Extension ready wait time |
|---|---|---|---|---|
| 10:11 | 10:19 | Trunk 2 | 5621 | 0S |
| 10:19 | 10:30 | Trunk 2 | 5622 | Transfer since 5621 is busy |
| 11:10 | 11:20 | Trunk 3 | 5633 | 10S |
| 11:20 | Not established | Trunk 1 | 5633 | Calling party disconnects after wait time of 15S |
|  |  |  |  |  |
|  |  |  |  |  |

FIG. 5

| Trunk number | Line provider name | Contract service | Destination setup |
|---|---|---|---|
| 1 | N | Normal conversation | Extension pilot group 1 |
| 2 | N | Normal conversation | Extension pilot group 1 |
| 3 | N | Normal conversation | Extension pilot group 1 |
| 4 | N | Normal conversation | Extension pilot group 1 |
| 5 | N | Normal conversation | Extension pilot group 1 |
| 6 | N | Normal conversation | Extension pilot group 1 |
| 7 | N | Normal conversation | Group 2 |
| 8 | N | Normal conversation | Group 2 |

FIG. 6

| Extension pilot group | Extension member | Maximum call wait count |
|---|---|---|
| 1 | 200<br>201<br>202<br>203 | 10 |
| 2 | 310<br>311<br>312<br>313 | 2 |

FIG. 7

| Extension number | Usable trunk group number | | | |
|---|---|---|---|---|
| 200 | 1 | | | |
| 201 | 1 | | | |
| 202 | 1 | | | |
| 300 | 2 | | | |
| 301 | 2 | | | |
| 302 | 2 | | | |

FIG. 8

| Trunk group number | Trunk member | Call wait count | | |
|---|---|---|---|---|
| 1 | 1, 2, 3 | 5 | | |
| 2 | 4, 5, 6, 7, 8 | 10 | | |
| | | | | |

FIG. 9

| Customer number | Telephone number of key telephone unit | Mail address of customer PC | Read-out timing of customer's communication log information | |
|---|---|---|---|---|
| 1 | 042-585-3625 | BT.@toshibo.co.jp | 3 months | |
| 2 | | | | |
| 3 | | | | |

FIG. 10

| Line provider | Service name | Time band | Distance | Fee (unit time) | Basic fee | Option |
|---|---|---|---|---|---|---|
| N | Long-distance call | 7:00-19:00 | 60 | 50 | 640 | |
| | | 19:00-23:00 | -240 | 40 | 640 | |
| | | 23:00-7:00 | 240- | 30 | 640 | |
| N | Local call | | | 10 | 640 | |
| T | Local call | | | 9 | 0 | |
| | | | | | | |
| | | | | | | |
| K | Long-distance call | 7:00-17:00 | -600 | 30 | 0 | |
| | | 17:00-7:00 | 600- | 25 | 0 | |

FIG. 11

| Password | Customer number | Trunk suggestion | Extention suggestion | Service suggestion |
|---|---|---|---|---|
| AWK52X10 | 1 | 1 | 3 | 9 |
| CX2031205 | 2 | | | |

| Type | Price | | | |
|---|---|---|---|---|
| Trunk | 10000 | | | |
| Extension | 30000 | | | |
| Service change fee | 2000 | | | |

FIG. 21

| Extension work number | Extension number | Extension pilot group to which it belongs | Trunk used to originate call | Other |
|---|---|---|---|---|
| 1 | 400 | 1 | | |
| | 401 | 1 | | |
| | | | | |

FIG. 22

| Trunk work number | Trunk number | Trunk group to which it belongs | Extension pilot of destination | |
|---|---|---|---|---|
| 1 | 10 | 1 | | |
| | 11 | 2 | | |
| | | | | |

FIG. 23

| Password | Customer number | Scheduled work date | Extension work number | Trunk work number |
|---|---|---|---|---|
| IGL9FG88 | 1 | 5/20 | 1 | 1 |
| | 2 | | | |
| | | | | |

1. Suggestion of extension of trunk
Select number of ports to be extended

| Extension used to originate call | Current number of possessed trunks Loss probability | Number of trunks to be additionally suggested Loss probability after addition | Number of trunks to be additionally suggested Loss probability after addition | |
|---|---|---|---|---|
| 200 201 202 | Trunk 2 Loss probability 35% | 1 Loss probability 25% | 2 Loss probability 5% | |
| 200 201 302 303 | Trunk 3 Loss probability 50% | 1 Loss probability 35% | 2 Loss probability 25% | 3 Loss probability 5% |

Back to previous page · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · To main page (5)

2. Suggestion of extension of extension
Select number of ports to be extended

| Extension pilot group number | Trunk used to originate call | Number of extensions Number of call losses | Number of extensions to be additionally suggested Loss probability after addition | Number of extensions to be additionally suggested Loss probability after addition |
|---|---|---|---|---|
| 1 | 1, 2, 3 4, 5, 6 | 4 35% | 1 20% | 2 10% |

Back to previous page · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · · To main page

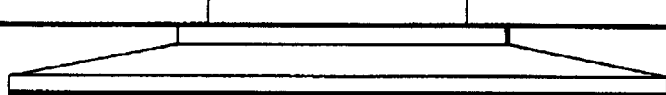

| Trunk | Current provider service | Current fee | Suggested provider service | Fee after change (converted based on previous conversation condition) |
|---|---|---|---|---|
| 1 | N Normal service | 68900 | T long distance service | 52030 |
| 2 | N Normal service | 154300 | K Partner designation service | 100900 |
| 3 | | | | |

3. Suggestion of trunk service provider
Select provider to be changed

Back to previous page       To main page (7)

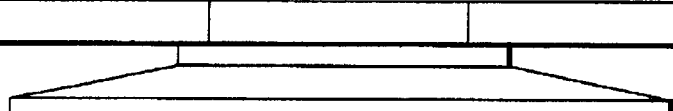

Confirm selected contents and fee
  Please apply after confirmation of
  contents and fee Trunk 2 ---------- 20000yen
 Extension 3 ------- 30000yen
 Service Change 4 --- 8000yen

[Submit]

Back to previous page       To main page

FIG. 28

(8)
Input detailed setup contents
  Input extension number and the like in blanks
Trunk number of trunk to be extended for trunk group 1
Dial number of extension to be extended for extension pilot group 1
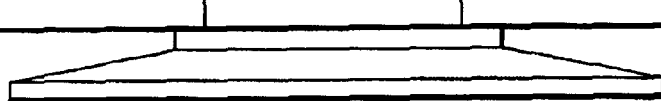
Back to previous page          To main page
(9)
Registration completed
Operation content download password is:IGL9FG88
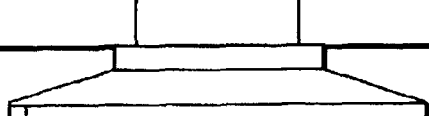
FIG. 29

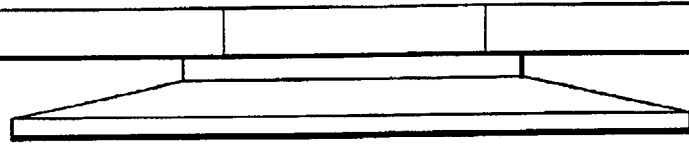
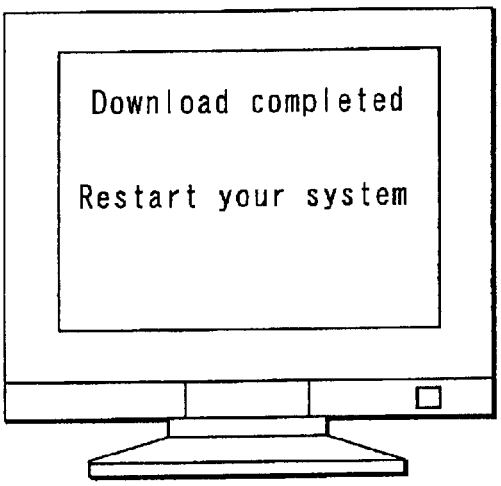
FIG. 33

| Unit code | Unit type | Number of lines |
|---|---|---|
| 1001 | ISDN(PRI) I/F | 1 |
| 1108 | ISDN(BRI) I/F | 8 |
| 1504 | CO I/F | 4 |
| 1508 | CO I/F | 8 |
| 5008 | Dedicated telephone I/F | 8 |
| 5016 | Dedicated telephone I/F | 16 |
| 5104 | Standard telephone I/F | 4 |
| 5108 | Standard telephone I/F | 8 |
| ...... | ...... | ...... |

FIG. 40

Select possible work date

Select possible work date from following dates

May

| Sunday | Monday | Tuesday | Wednesday | Thursday | Friday | Saturday |
|--------|--------|---------|-----------|----------|--------|----------|
| 1 | 2 | 3 | 4 | 5 | 6 | 7 |
| 29 | 30 | 31 | | | | |

Submit

Back to previous page         To main page

FIG. 44

SERVICE PROVIDING METHOD FOR ELECTRONIC DEVICE, CUSTOMER CENTER, AND USER SYSTEM

CROSS-REFERENCE TO RELATED APPLICATIONS

This application is based upon and claims the benefit of priority from the prior Japanese Patent Application No. 2001-094161, filed Mar. 28, 2001, the entire contents of which are incorporated herein by reference.

BACKGROUND OF THE INVENTION

1. Field of the Invention

The present invention relates to a service providing method used upon providing a new service associated with a key telephone unit to the user who has the key telephone unit, a customer center for providing that service, and an user system comprising the key telephone unit.

2. Description of the Related Art

In offices or business establishments, telephone exchanges such as electronic private branch exchanges, key telephone units, and the like are prevalently used. Upon purchasing and using such telephone exchange, the user purchases a telephone exchange having functions of his or her choice at that time.

In the telephone exchange, upon termination of an incoming call, the caller side may have to wait or connection to a desired destination may fail if the callee side is busy. For this reason, the number of trunks must be increased, or groups on the extension side must be changed. In such case, conventionally, the status quo must be recognized, and a new configuration must be built. Such processes must be done by the user who uses the telephone exchange, and expert knowledge and much labor are required.

On the other hand, at the time of introduction of a telephone exchange, a maintenance person can suggest an apparatus configuration. However, upon changing functions due to variations of conditions (e.g., an increase in traffic due to an increase in corporate scale after the beginning of use, required units are added based upon experience in response to the user's request.

To solve this problem, a user management scheme is adopted. That is, users are listed up to periodically confirm their states, thus estimating the potential extension demand. Upon practicing a unit extension suggestion, propriety is confirmed by user follow after introduction.

However, with this method, although laborsaving is achieved due to digital user information, negotiations with actual users are required, and required man power is not so small. After practice of the unit extension suggestion, that suggestion may even prove to be inappropriate.

BRIEF SUMMARY OF THE INVENTION

It is an object of the present invention to provide a service providing method for an electronic device, a customer center, and user system, which can quickly and appropriately make an appropriate unit extension suggestion and a suggestion of a new inside comprise or internal configuration of the electronic device depending on a use condition to the user without requiring any man power, and can reduce the cost and labor loads on the user, can shorten the time required for unit extension, and can reduce the cost and labor in the customer center.

In order to achieve the above object, the present invention provides a service in the following procedure.

In a method of providing an user system a new service associated with an electronic device in the user system in accordance with information being communicated through a communication network, between the user system and a customer center for carrying out an operation support business for the electronic device, the electronic device storing communication log information and operation data, executing a predetermined communication process on the basis of the operation data, the customer center accesses the electronic device through the communication network at a predetermined interval to acquire the communication log information from the electronic device, judges the a communication traffic condition of the electronic device on the basis of the acquired communication log information, determines a new inside configuration of the electronic device to be suggested to the user system on the basis of the communication traffic condition, and transmits a configuration information indicative of the determined inside configuration to the user system through the communication network.

BRIEF DESCRIPTION OF THE SEVERAL VIEWS OF THE DRAWING

FIG. 4 shows an example of the storage contents of a communication log information storage unit shown in FIG. 3;

FIG. 5 shows an example of the storage contents of the communication log information storage unit shown in FIG. 3;

FIG. 6 shows an example of the storage contents of an operation data storage unit shown in FIG. 3;

FIG. 7 shows an example of the storage contents of the operation data storage unit shown in FIG. 3;

FIG. 8 shows an example of the storage contents of the operation data storage unit shown in FIG. 3;

FIG. 9 shows an example of the storage contents of the operation data storage unit shown in FIG. 3;

FIG. 10 shows an example of the storage contents of a basic customer information table shown in FIG. 3;

FIG. 11 shows an example of the storage contents of a line service information table shown in FIG. 3;

FIG. 21 shows an example of the storage contents of a fee table shown in FIG. 20;

FIG. 22 shows an example of the storage contents of an extension additional data table in a factory setup change information table shown in FIG. 20;

FIG. 23 shows an example of the storage contents of a trunk additional data table in the factory setup change information table shown in FIG. 20;

FIG. 24 shows an example of the storage contents of a password corresponding work information record table shown in FIG. 20;

FIG. 27 shows an example of a display screen of suggestion contents provided by the customer center in the maintenance personal computer shown in FIG. 1;

FIG. 28 shows an example of a display screen of suggestion contents provided by the customer center in the maintenance personal computer shown in FIG. 1;

FIG. 29 shows an example of a display screen of suggestion contents provided by the customer center in the maintenance personal computer shown in FIG. 1;

FIG. 33 shows an example of a display screen displayed upon downloading operation data in the maintenance personal computer shown in FIG. 1;

FIG. 40 shows an example of the storage contents of an S-RAM shown in FIG. 39;

FIG. 44 shows an example of a display screen displayed upon selecting a work date in the maintenance personal computer shown in FIG. 1.

DETAILED DESCRIPTION OF THE INVENTION

Some embodiments of the present invention will be described in detail hereinafter with reference to the accompanying drawings.

Figure 1:
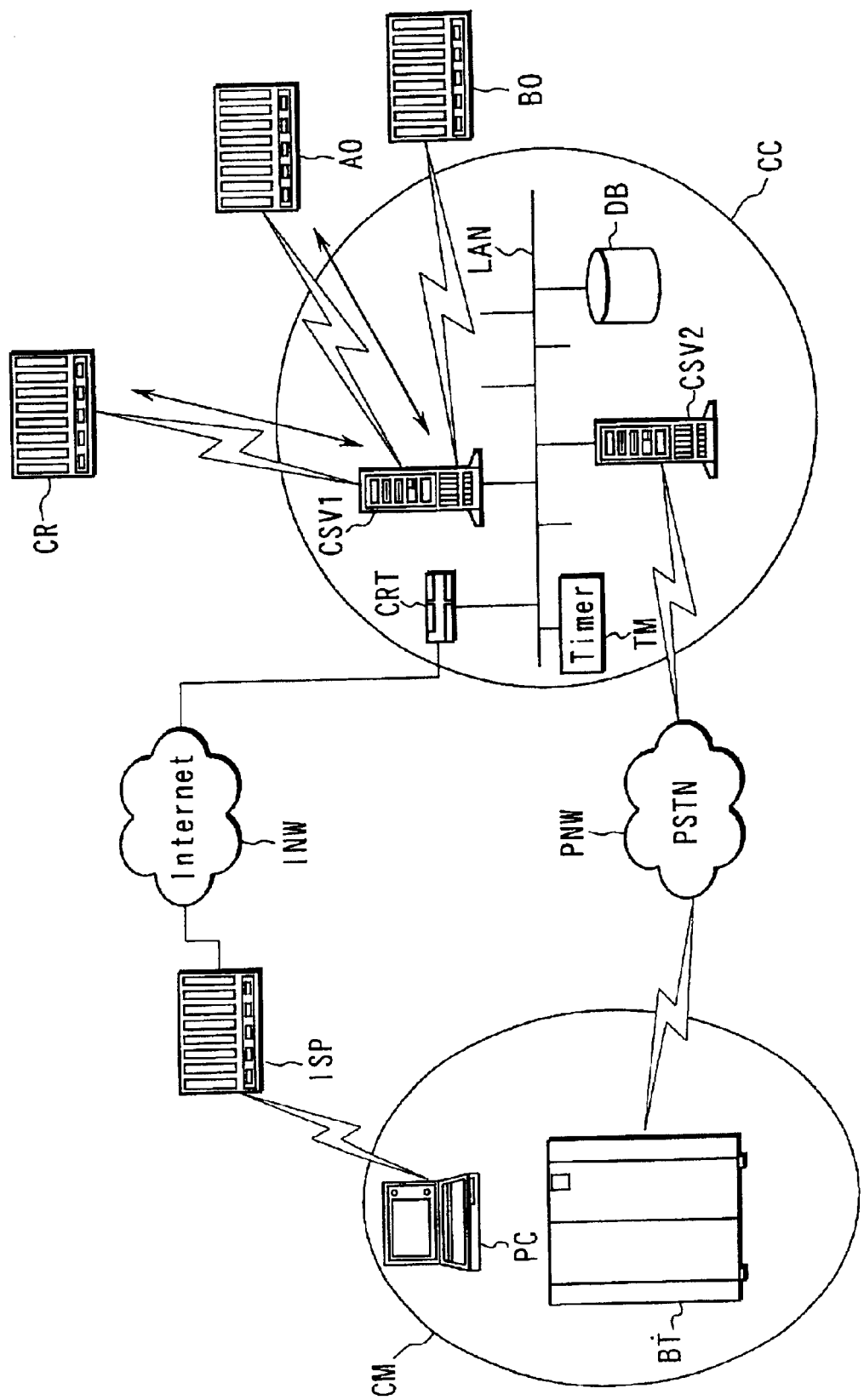
FIG. 1 is a schematic diagram of a system that practices a service providing method of the present invention.

FIG. 1 is a schematic diagram of a support system that implements the service providing method of the present invention. Reference symbol CM denotes an user system; CC, a customer center; CR, a credit company; AO, a work agent; and BO, a parts factory.

The user system CM comprises a key telephone unit BT and maintenance personal computer PC. The key telephone unit BT has a function of exchanging and connecting between a plurality of extension terminals (not shown) and between these extension terminals and a subscriber's line of a public network PNW in response to an incoming or outgoing call as a basic function, and also has a plurality of option service functions associated with this exchange connection process. The option service functions include, for example, a call pickup function, call forward function, multi-appearance function, and the like.

The maintenance personal computer PC is connected to the Internet INW via a provider ISP, and also to the customer center CC from the Internet INW.

The customer center CC comprises a reception/accounting server CSV1, license server CSV2, router CRT, line service database DB, and timer TM, which are interconnected via a LAN. The reception/accounting server CSV1 is connected to the Internet INW via the router CRT, and receives a service request coming from the maintenance personal computer of the user system CM. Also, the reception/accounting server CSV1 is connected to the credit company CR via, e.g., a dedicated line, and executes a settlement process of a charge required to add functions together with the credit company CR. Furthermore, the reception/accounting server CSV1 is connected to the work agent AO and parts factory BO via, e.g., dedicated lines to exchange information associated with a service.

The license server CSV2 is connected to the key telephone unit BT of the user system CM via the public network PNW. The license server CSV2 has a function of acquiring, from the key telephone unit BT, a device identification number (system ID) uniquely assigned to each key telephone unit, and communication log information and operation data stored in the key telephone unit BT, and a function of sending operation data to the key telephone unit BT to additionally set functions.

(First Embodiment)

The first embodiment relates to the user system CM and customer center CC shown in FIG. 1.

Figure 2:
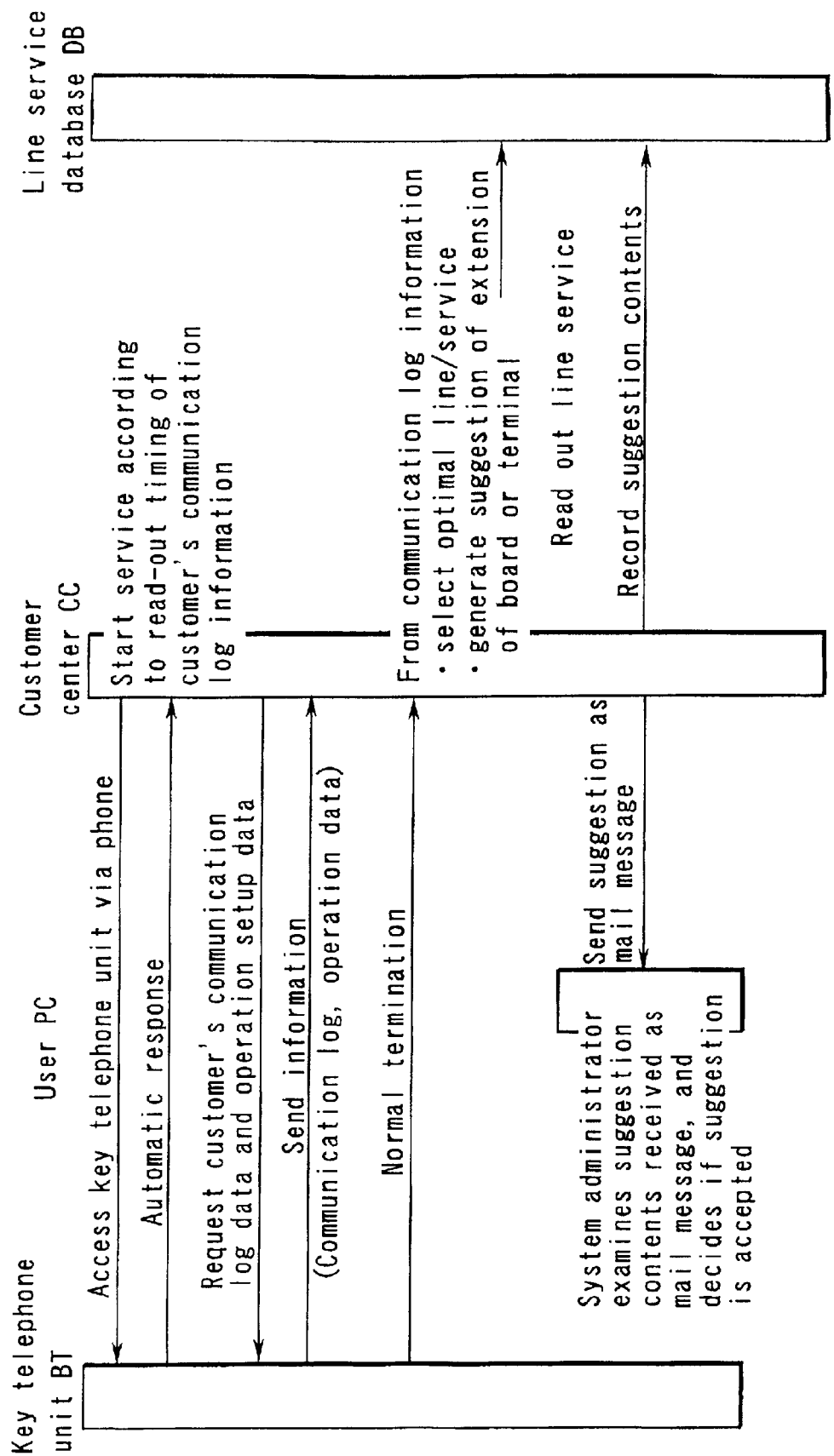
FIG. 2 is a sequence chart for explaining an outline of a service providing method in the first embodiment of the present invention.

FIG. 2 is a sequence chart for explaining the sequence upon suggesting an optimal inside comprise of the key telephone unit BT to the user in the first embodiment.

To receive the service of this embodiment, the user makes a contract with the customer center CC in advance. That contract includes determination of a suggestion period, an item that allows the customer center to acquire user's communication log information, an item that inhibits the acquired information from leaking, and the like.

When a date determined by the contract has been reached, the customer center CC accesses the key telephone unit BT of the user system CM via the public network PNW. Upon receiving a communication log information read-out request from the customer center CC, the key telephone unit BT transmits the communication log information and operation data stored therein to the customer center CC.

Upon normal termination of information exchange between the customer center CC and user's key telephone unit BT, the communication line is disconnected.

On the other hand, the customer center CC analyzes on the basis of the communication log information and operation data of the user system CM if any call losses have occurred due to deficiency of terminals and lines in the current use environment of the user, and so forth, and generates a suggestion to the user.

The customer center CC then transmits the generated suggestion contents to the maintenance personal computer PC (user PC) as a mail message, and writes the suggestion contents in the line service database DB.

The user examines the suggestion contents received from the customer center CC. If the user has decided that the suggestion from the customer center CC is necessary, he or she requests the customer center CC to extend the system and to provide a service.

Note that the arrangement of respective units of the support system which implements the aforementioned service providing method is as follows.

Figure 3:
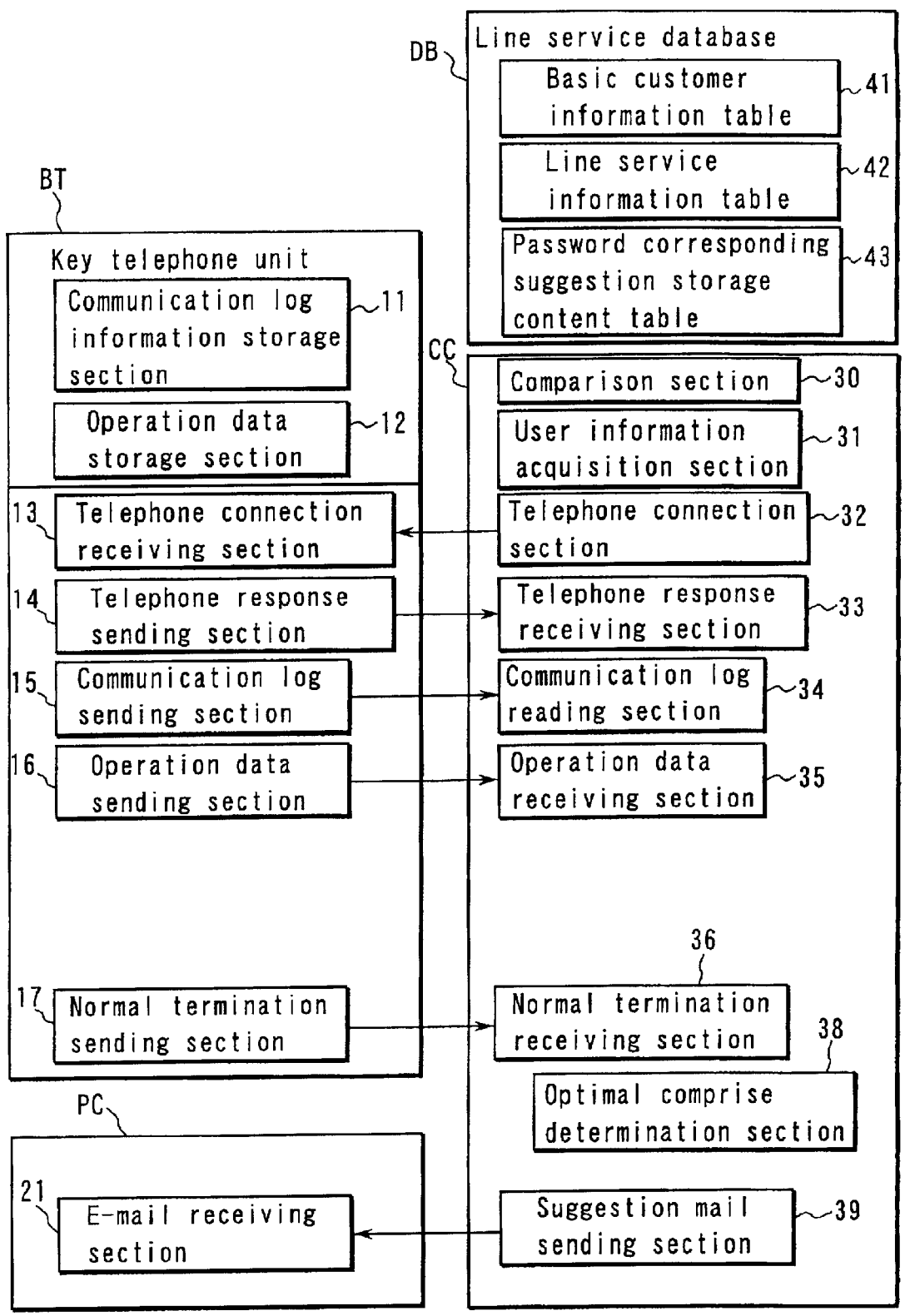
FIG. 3 is a block diagram showing the functional arrangement of respective units of a system in the first embodiment of the present invention.

FIG. 3 is a block diagram showing the functional arrangement of the maintenance personal computer PC, key telephone unit BT, and customer center CC.

The key telephone unit BT comprises a communication log information storage section 11, operation data storage section 12, telephone connection receiving section 13, telephone response sending section 14, communication log sending section 15, operation data sending section 16, and normal termination sending unit 17.

Of these sections, the communication log information storage section 11 stores the call origination time, voice communication time, destination dial number, information indicating unsuccessful call origination due to busy lines upon originating a call in the system, call reception time upon receiving a call from the network, information indicating a non-response call, and the like, as shown in FIGS. 4 and 5. The operation data storage section 12 stores operation data for system operations, as shown in FIGS. 6 to 9.

The telephone connection receiving section 13 and telephone response sending section 14 receive a call coming from the customer center CC and transmit a response thereto. The communication log sending section 15 transmits information stored in the communication log information storage section 11 to the customer center CC upon receiving an acquisition request of communication log information from the customer center CC. The operation data sending section 16 transmits information stored in the operation data storage section 12 to the customer center CC upon receiving an acquisition request of operation data from the customer center CC. The normal termination sending section 17 transmits a message indicating that the communication log information and operation data are normally sent to the customer center CC.

The maintenance personal computer PC comprises an e-mail receiving section 21. This e-mail receiving section 21 receives system extension and service suggestions from the customer center CC as e-mail messages.

The customer center CC comprises a comparison section 30, user information acquisition section 31, telephone connection section 32, telephone response receiving section 33, communication log reading section 34, operation data receiving section 35, normal termination receiving section 36, optimal comprise determination section 38, and a suggestion mail sending section 39.

Of these sections, the comparison section 30 compares a date measured by the timer TM with the periodic inspection date contained in the contract made with the user. The user information acquisition section 31 reads out user information from the line service database DB, and launches a communication log information read-out process from the corresponding user system CM on the basis of the user information when the comparison result of the comparison section 30 matches.

The telephone connection section 32 and telephone response receiving section 33 establish a link to the key telephone unit BT, and make preparation for making the key telephone unit BT transmit communication log information. The communication log reading section 34 receives communication log information from the user system CM. The operation data receiving section 35 receives operation data of the key telephone unit BT. The normal termination receiving section 36 receives a signal indicating that the user system CM has normally sent the communication log information and operation data.

The optimal comprise determination section 38 determines deficient system comprise components to be extended such as terminals, lines, and the like in the equipment of the user system CM on the basis of the communication log information and operation data acquired from the user system CM. The suggestion mail sending section 39 transmits a suggestion to the user obtained by the optimal comprise determination section 38 as an e-mail message.

On the other hand, the line service database DB comprises a basic customer information table 41, line service information table 42, and password corresponding suggestion storage content table 43.

The basic customer information table 41 stores a table that records customer information required to provide an automatic service, as shown in FIG. 10. That is, this table contains the telephone number required to access the user's key telephone unit BT, the launch timing of an automatic service, and the like.

The line service information table 42 stores a table that summarizes comparison data of respective line providers, which are required to search for a line and service optimal to the user, as shown in FIG. 11.

Figures 12, 13:
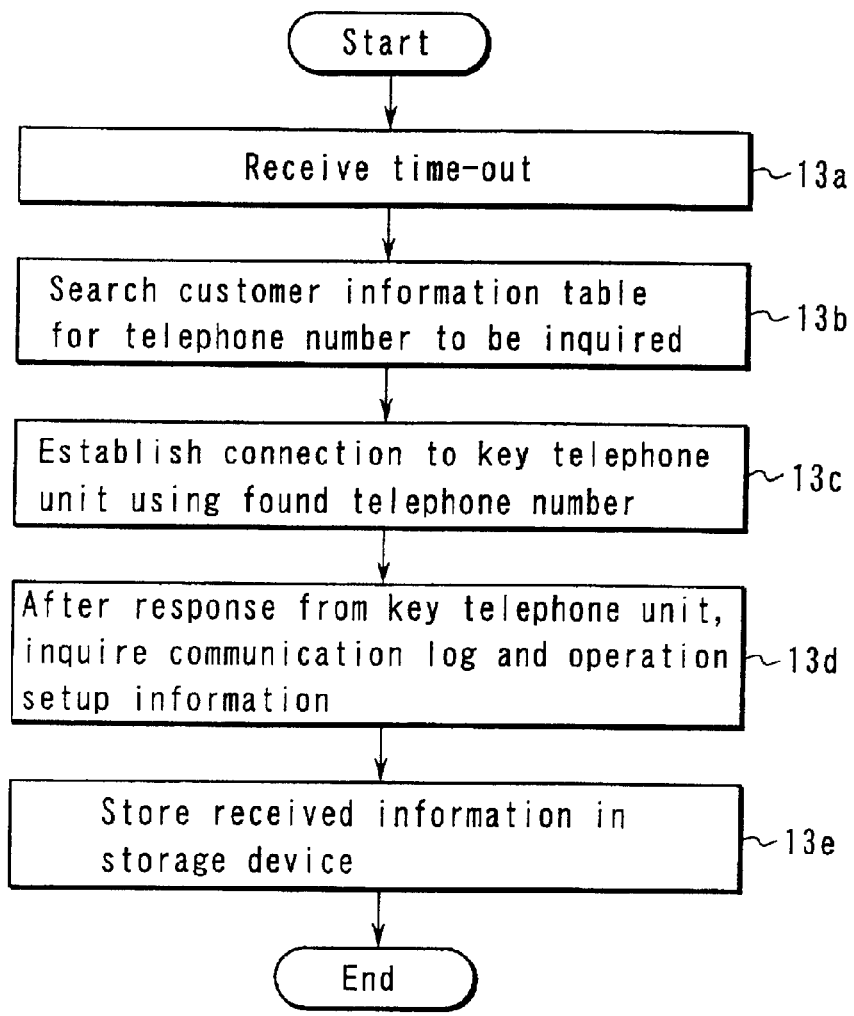
FIG. 12 shows an example of the storage contents of a password corresponding suggestion storage content table shown in FIG. 3.
FIG. 13 is a flow chart showing the processing sequence and contents of a customer center of the system in the first embodiment of the present invention.

The password corresponding suggestion storage content table 43 stores a table that stores contents suggested to the users, as shown in FIG. 12.

Figure 14:
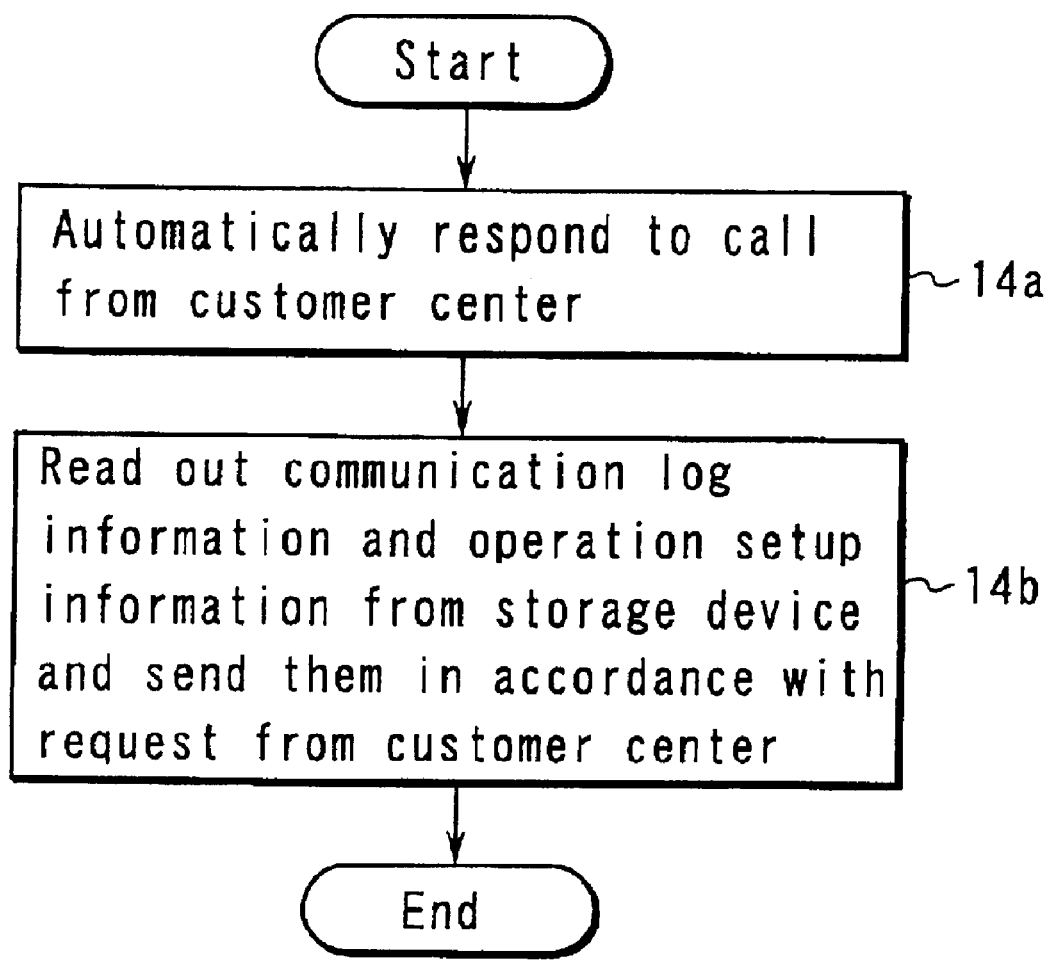
FIG. 14 is a flow chart showing the processing sequence and contents of a key telephone unit upon receiving a call from the customer center in the system in the first embodiment of the present invention.

FIG. 13 is a flow chart showing the operation of the customer center CC, and the processing operation for acquiring communication log information and operation (operation setup information) from the key telephone unit BT in accordance with the sequence shown in steps 13a to 13e is executed. Also, FIG. 14 is a flow chart showing the operation of the key telephone unit BT corresponding to the processing operation of the customer center CC.

That is, upon receiving time-out from the timer TM (step 13a), the customer center CC reads out corresponding customer information from the basic customer information table 41 in the line service database DB (step 13b), and accesses the key telephone unit BT of the customer via the public network PNW using the telephone number or mail address contained in the readout information (step 13c). Upon receiving a response from the key telephone unit BT, the customer center CC transmits a request signal used to acquire communication log information and operation data from the key telephone unit BT to the key telephone unit BT (step 13d). Upon receiving the communication log information and operation data from the key telephone unit BT in response to the request signal, the customer center CC stores these communication log information and operation data in a storage unit (not shown) (step 13e).

On the other hand, in response to an incoming call from the customer center CC, the key telephone unit BT receives that call and transmits a response to it (step 14a). After that, upon receiving an acquisition request of communication log information and operation data from the customer center CC, the key telephone unit BT reads out the communication log information and operation data stored therein, and transmits them to the customer center CC (step 14b).

Figure 15:
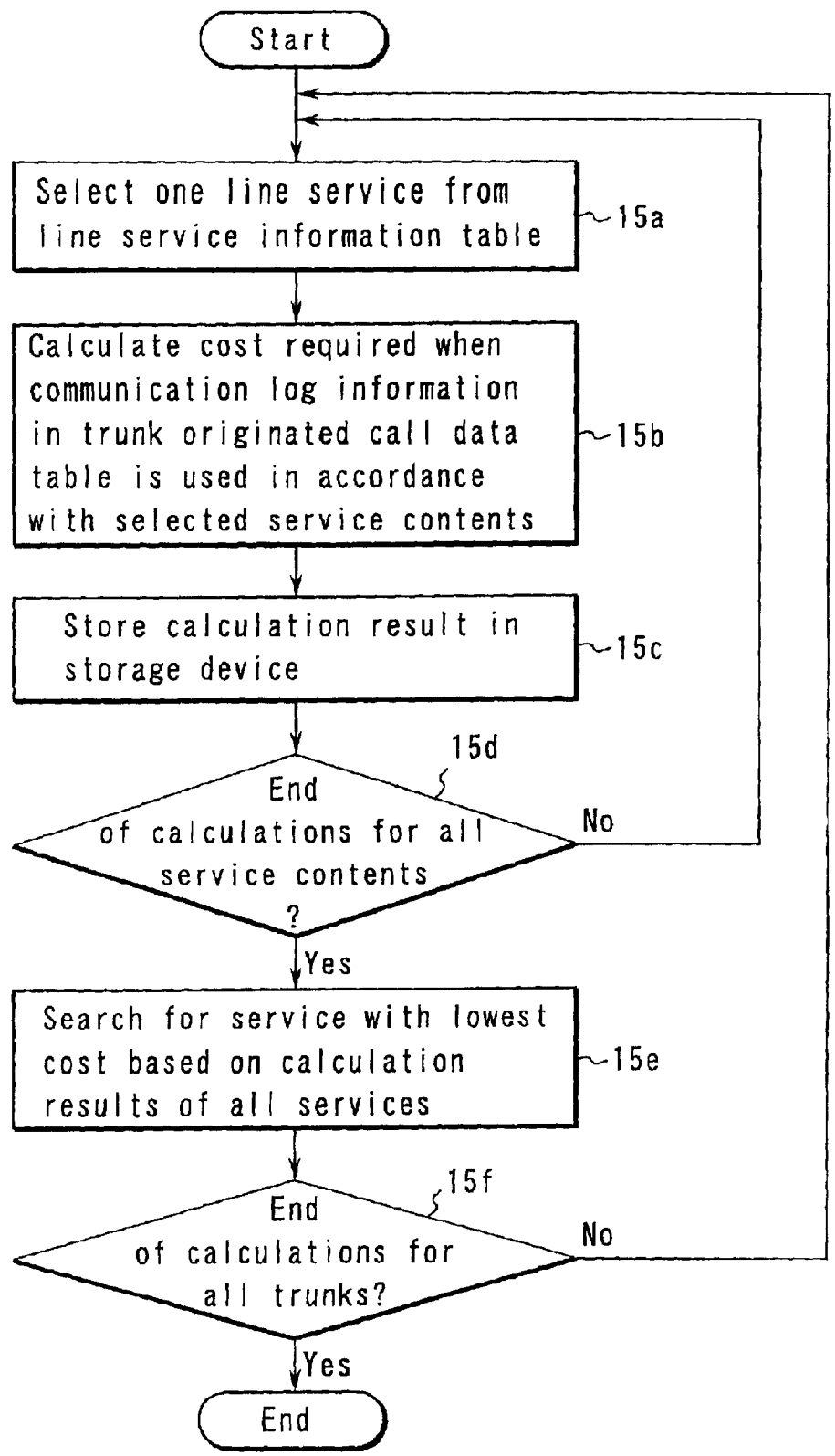
FIG. 15 is a flow chart showing the processing sequence and contents of the customer center upon receiving communication log information from the key telephone unit in the system in the first embodiment of the present invention.

Subsequently, the customer center CC executes the processing operation shown in FIG. 15.

That is, the customer center CC selects a service of one line provider from those stored in the line service information table 42 (step 15a), and calculates a fee using the communication log information acquired from the key telephone unit BT in accordance with the selected service contents (step 15b). Then, the customer center stores the calculated fee in a storage unit (not shown) (step 15c).

The customer center CC checks if fee calculations for all line providers stored in the line service information table 42 are complete, and repeats the processes in steps 15a to 15d until they are complete.

Upon completion of the fee calculations for all the line providers, the customer center CC searches for a line provider of the lowest fee from the calculated fees (step 15e), and repeats the processes in steps 15a to 15f for all trunks.

Figure 16:
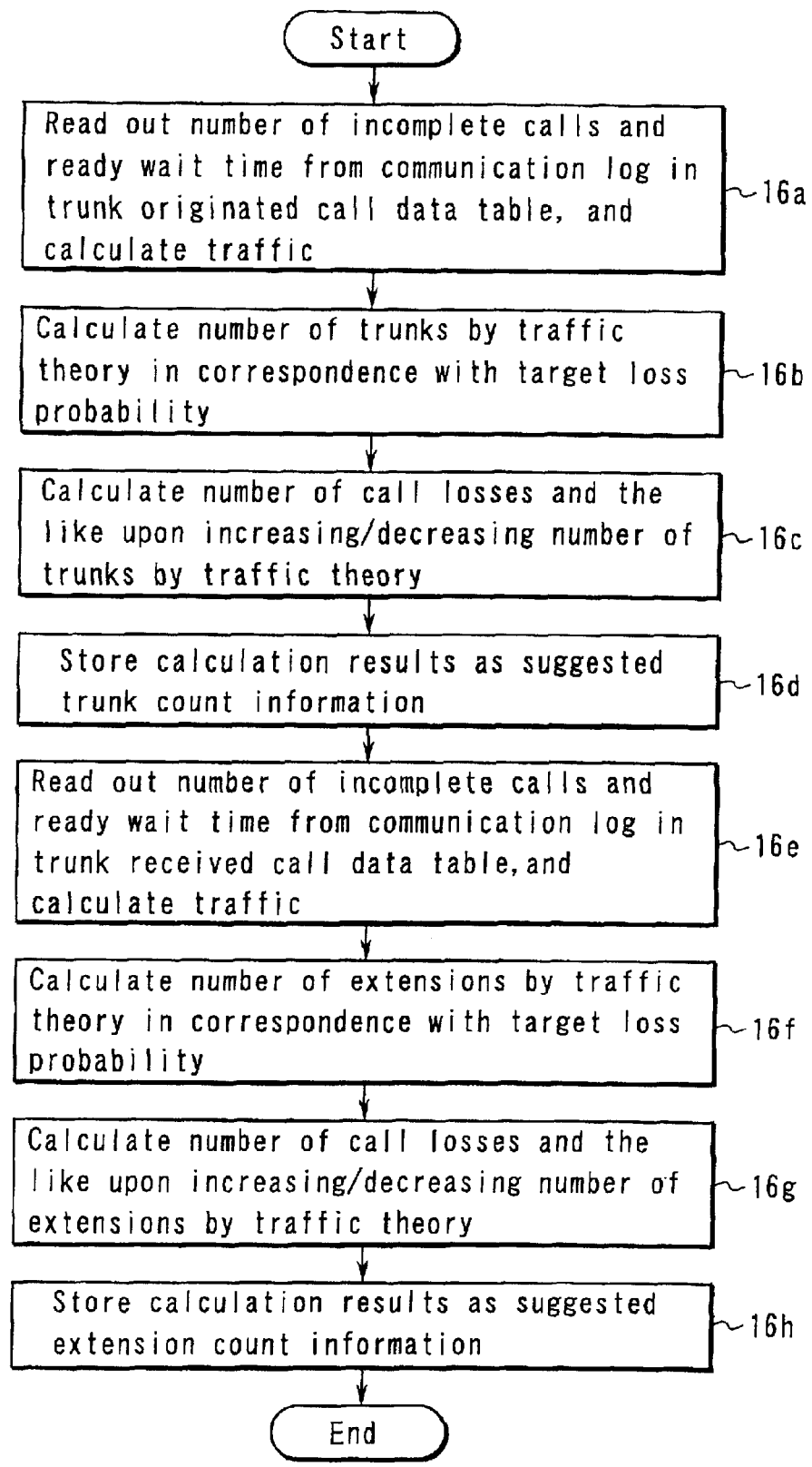
FIG. 16 is a flow chart showing the processing sequence and contents of the customer center upon receiving communication log information from the key telephone unit in the system in the first embodiment of the present invention.

Furthermore, the customer center CC executes the processing operation shown in FIG. 16.

That is, the customer center CC reads out the number of incomplete calls and busy time from the communication log information acquired from the key telephone unit BT to calculate the traffic (step 16a). Also, the customer center CC calculates the number of trunks corresponding to a target loss probability using a traffic theory (step 16b), also calculates a loss probability upon increasing/decreasing the number of trunks using the traffic theory (step 16c), and stores the calculation results as suggestion trunk count information (step 16d).

Furthermore, the customer center CC executes the processes in steps 16e to 16h to obtain suggestion extension count information.

Figure 17:
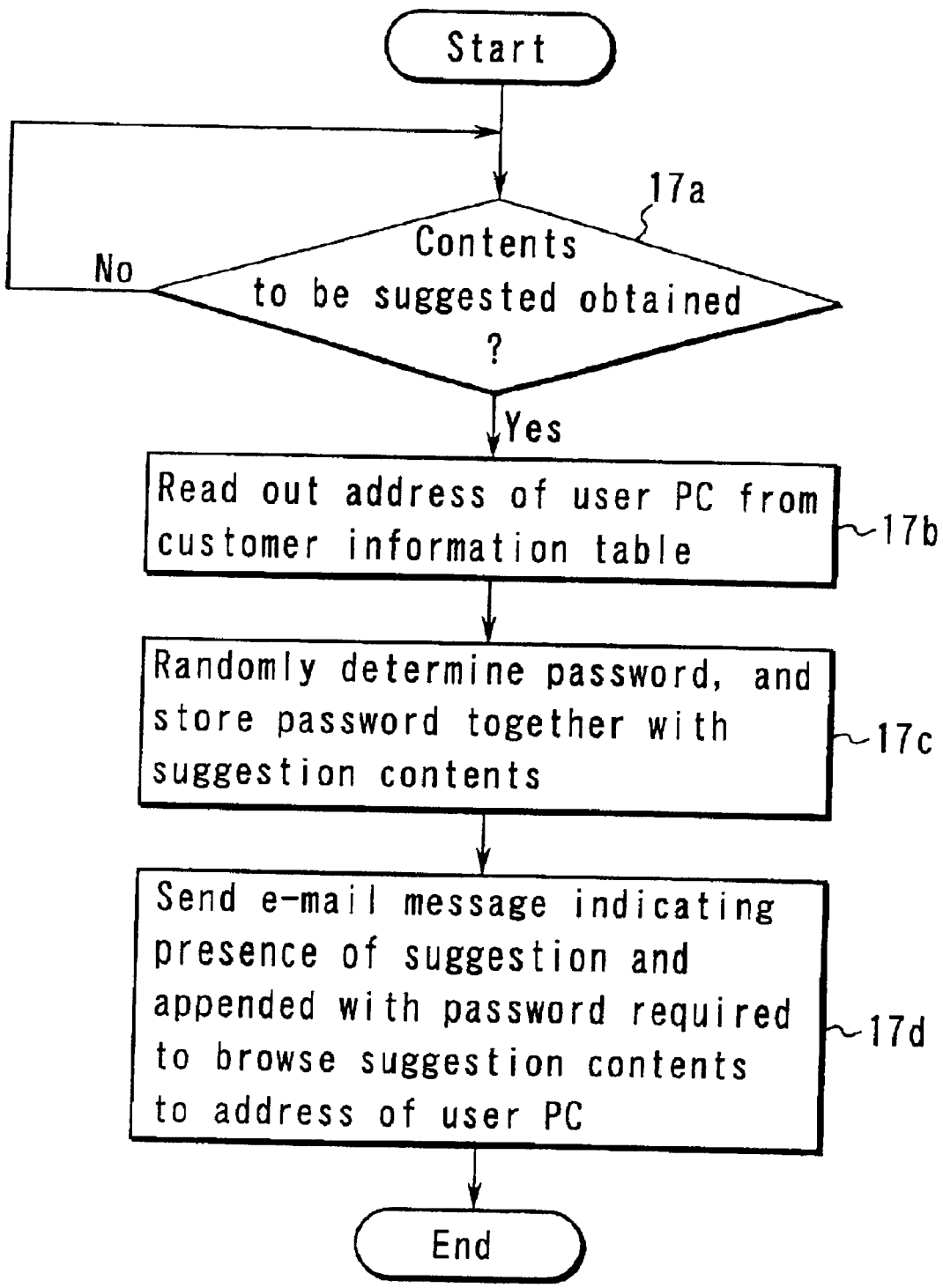
FIG. 17 is a flow chart showing the processing sequence and contents of the customer center when a good suggestion is provided in the system in the first embodiment of the present invention.

After the suggestion contents are determined, the customer center CC executes the processing operation shown in FIG. 17.

That is, if it is determined that contents to be suggested are determined (step 17a), the customer center CC reads out the mail address of the corresponding maintenance personal computer PC from the basic customer information table 41 (step 17b), randomly determines a password and stores this password in a storage unit (not shown) together with the suggestion contents (step 17c), and transmits an e-mail message that indicates the presence of the suggestion and is appended with the password used to browse the suggestion contents to the corresponding maintenance personal computer PC (step 17d).

As described above, according to the service providing method of the first embodiment, the communication log condition of the key telephone unit BT is periodically monitored by the customer center CC, and a message indicating the presence of a suggestion of an inside comprise optimal to the key telephone unit BT is automatically sent to the maintenance personal computer PC via the Internet INW on the basis of the communication traffic determined from the monitored communication log condition. Therefore, the user can select an optimal inside comprise of the key telephone unit BT without spending any labor and cost, while the customer center CC can greatly reduce labor and cost required to suggest the inside comprise of the key telephone unit BT.

Furthermore, in the first embodiment, a password required to access the customer center CC is sent to the user system CM before information that indicates the suggestion contents of the inside comprise of the key telephone unit BT is sent. For this reason, the customer center CC can provide the suggestion contents only if such contents are required by the user, and can greatly reduce the information size to be transferred to the user system CM. Also, information indicating the suggestion contents to an authentic user who has made a contract can be prevented being hacked by another user.

(Second Embodiment)

The second embodiment relates to the user system CM, customer center CC, and credit company CR shown in FIG. 1.

Figure 18:
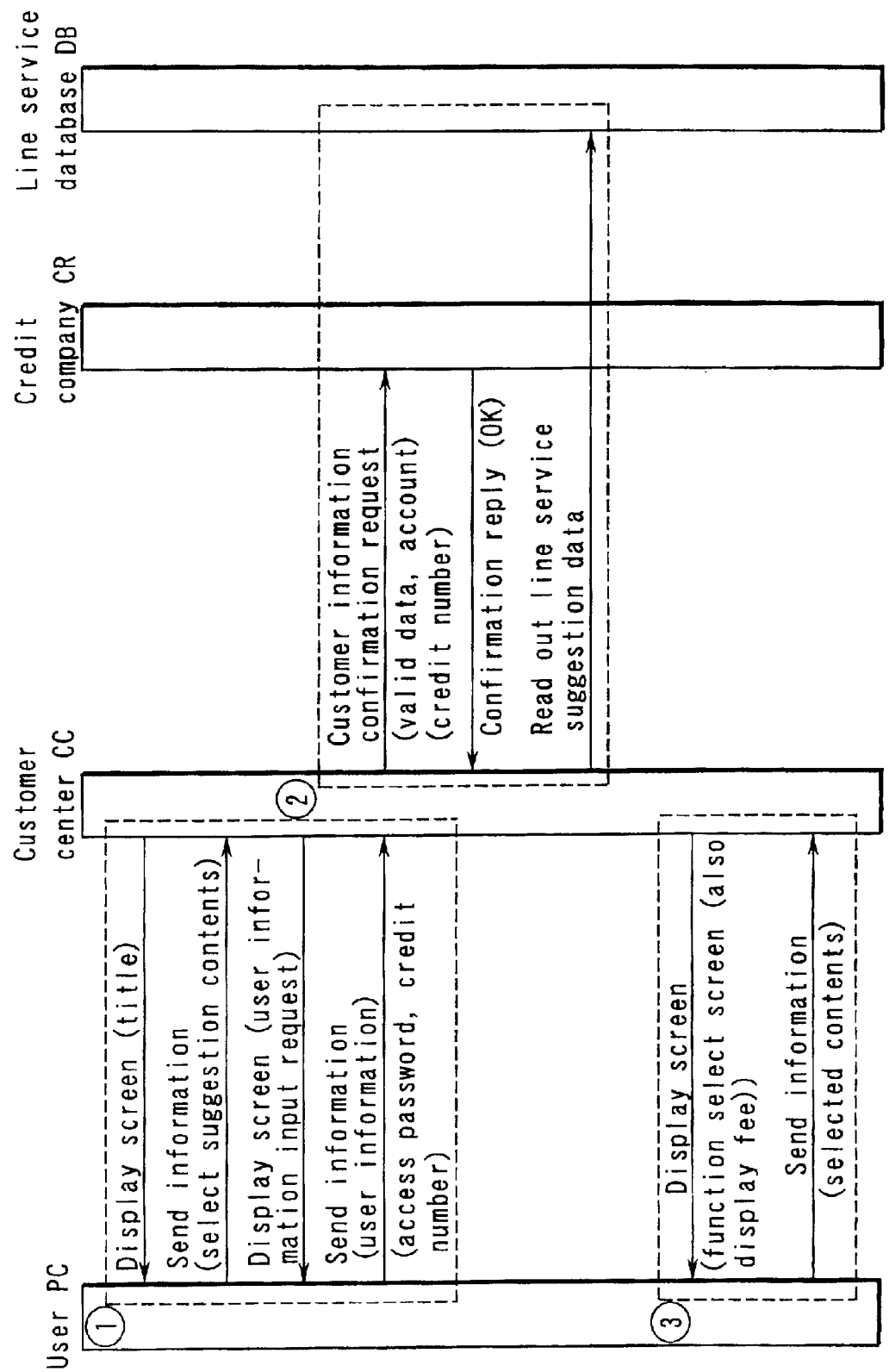
FIG. 18 is a sequence chart for explaining an outline of a service providing method in the second embodiment of the present invention.
Figure 19:
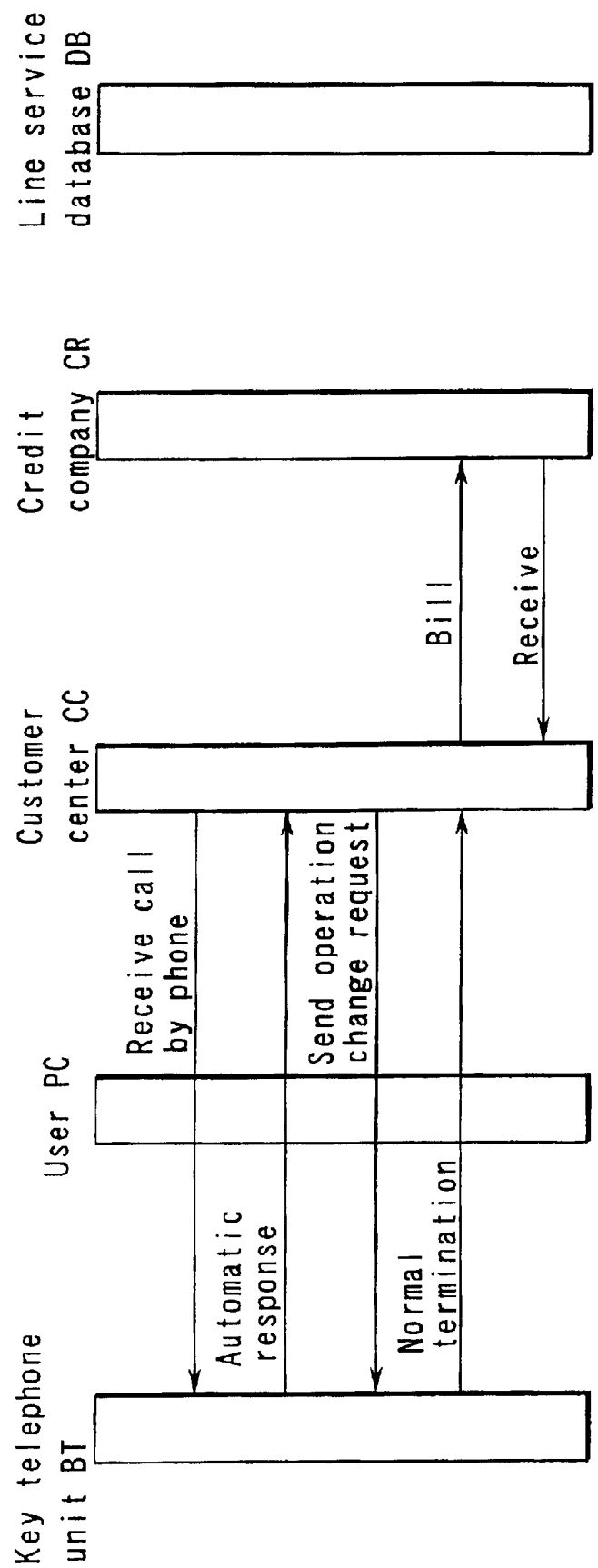
FIG. 19 is a sequence chart for explaining an outline of the service providing method in the second embodiment of the present invention.

FIGS. 18 and 19 are sequence charts for explaining the processing sequence between the user system CM and customer center CC when the user has selected the suggestion in the second embodiment.

The user accesses the home page of the customer center CC via the Internet INW using the maintenance personal computer PC, and selects "suggestion contents" display in accordance with the guidance on the screen downloaded from the customer center CC. Upon selection of "suggestion contents" display, the customer center CC prompts the user to input information (password, credit number, and the like) required to suggest the suggestion contents.

Upon completion of input of the required information, the maintenance personal computer PC transmits a suggestion content display request containing such information to the customer center CC.

Upon receiving the suggestion content display request, the customer center CC checks the authenticity of the user using the password. If the user is authentic, the customer center CC accesses the credit company CR via the dedicated line, and inquires of the credit company CR about the credit history of the user. In response to this inquiry, the credit company CR checks the presence/absence of an account corresponding to the credit number, if the credit term has expired, and if use suspension is not set. Then, the credit company CR returns a reply to the customer center CC.

On the basis of the reply from the credit company CR, the customer center CC checks the credit history of the user. If no problem is found, the customer center CC reads out suggestion information from the line service database DB, and transmits that suggestion information to the user's maintenance personal computer PC via the Internet INW together with the cost required for execution of the contract on the basis of the mail address contained in the suggestion content display request.

Upon receiving selection contents from the user in response to the above message, the customer center CC generates an operation command containing new operation data to be provided to the user as the request source in accordance with the operation data stored in the line service database DB and the selected request contents.

The customer center CC originates a call to the user's key telephone unit BT via the public network PNW on the basis of the telephone number read out from the line service database DB. When the key telephone unit BT responds to this call, the customer center CC transmits the operation command.

The key telephone unit BT changes its inside system comprise in accordance with the received operation command, and starts operation in accordance with the changed contents.

In this case, when the key telephone unit BT is provided with a function of automatically testing the operation of the changed system comprise and a function of reverting the changed comprise if any problem is found as a result of the test, the reliability can be improved.

Upon receiving a message indicating that the change in operation is normally terminated from the key telephone unit BT, the customer center CC disconnects the line with the key telephone unit BT, and then accesses the credit company CR to request it to settle the operation change fee. In this case, the customer center CC calculates a charge for functions which are actually set as operation data in accordance with the change request from the user, and generates a digital bill.

Upon receiving the settlement request information, the credit company CR makes user authentication and checks the possibility of a transaction on the basis of the credit number of the user contained in this settlement request information. If a transaction is possible, the credit company CR executes a charge settlement reception process on the basis of the digital bill contained in the settlement request information. Upon completion of this settlement reception process, the credit company CR transmits back a reply indicating that the settlement request is received to the customer center CC as the request source.

Upon receiving the reception reply of the settlement request from the credit company CR, the customer center CC transmits information indicating that the operation change process is complete to the user's maintenance personal computer PC and displays it.

In this manner, the operation data corresponding to the change request is set in the key telephone unit BT in a usable state, and the user's key telephone unit BT can use the changed, new operation data.

Note that the arrangement of the respective units of the support system that implements the operation change method is as follows.

Figure 20:
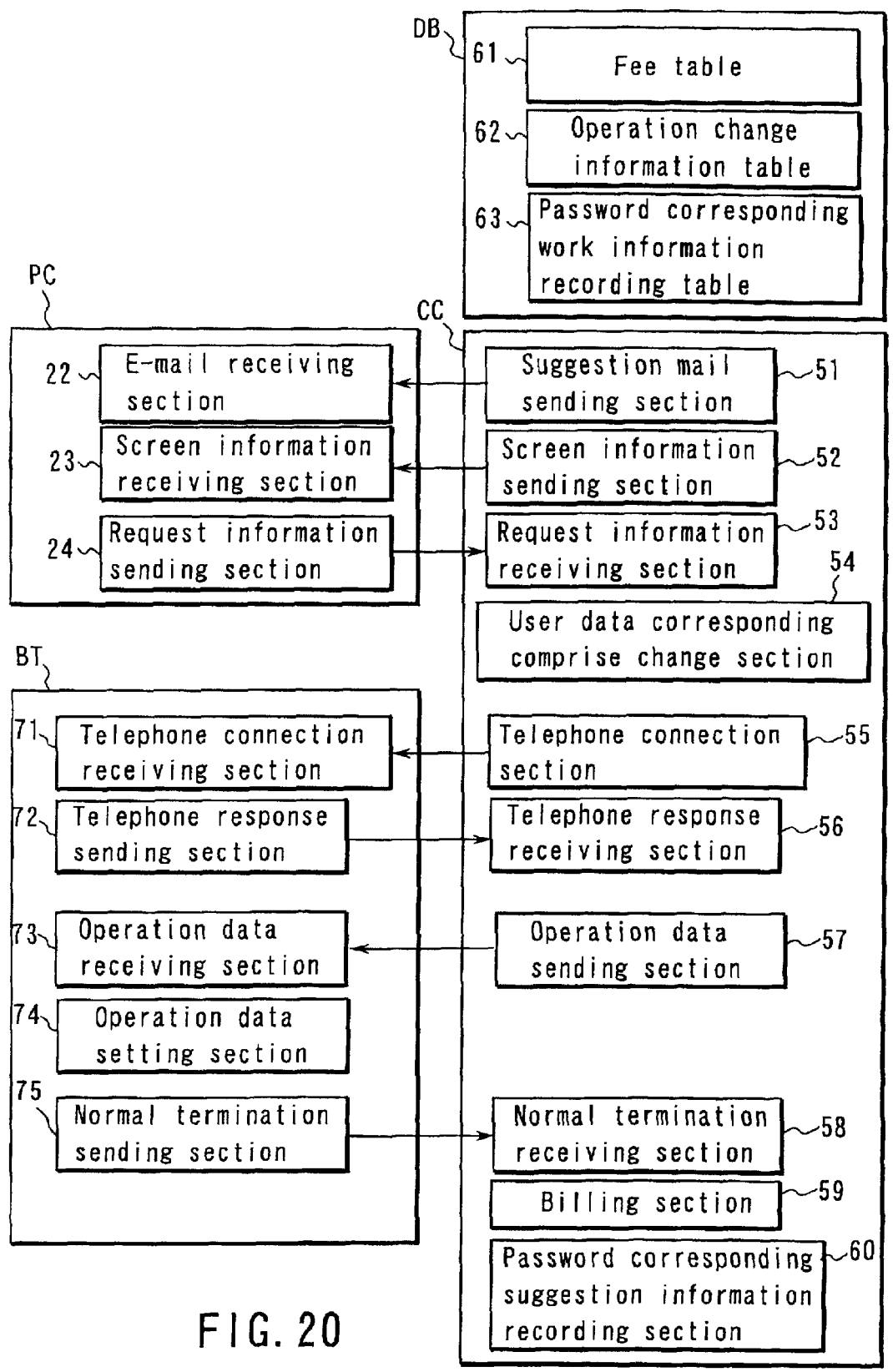
FIG. 20 is a block diagram showing the functional arrangement of respective units of a system in the second embodiment of the present invention.

FIG. 20 is a block diagram showing the functional arrangement of the maintenance personal computer PC, key telephone unit BT, and customer center CC.

The maintenance personal computer PC comprises an e-mail receiving section 22 and screen information receiving section 23 for receiving information sent from the customer center CC, and a request information sending section 24 for sending request information to the customer center CC.

The key telephone unit BT comprises a telephone connection receiving section 71, telephone response sending section 72, operation data receiving section 73, operation data setting section 74, and normal termination sending section 75 as functions according to the present invention.

The telephone connection receiving section 71 and telephone response sending section 72 receive a call coming from the customer center CC and transmit a response to it. The operation data receiving section 73 and operation data setting section 74 receive operation data sent from the customer center CC, and set the data.

The customer center CC comprises a suggestion mail sending section 51 for sending suggestion contents as an e-mail message, a screen information sending section 52 for sending screen information to the maintenance personal computer PC, a request information receiving section 53 for receiving request information from the maintenance personal computer PC, a user data corresponding comprise change section 54 for determining details of service contents and system comprise on the basis of user's operation contents, a telephone connection section 55, a telephone response receiving section 56, an operation data sending section 57, a normal termination receiving section 58, a billing section 59, and a password corresponding suggestion information recording section 60.

The telephone connection section 55 and telephone response receiving section 56 access the key telephone unit BT on the basis of the telephone number contained in received request information via the public network PNW, and receive a response from that key telephone unit BT.

The operation data sending section 57 transmits the changed, new operation data to the key telephone unit BT.

The normal termination receiving section 58 receives a normal termination signal sent from the key telephone unit BT after the operation change process. The billing section 59 transmits the previously calculated bill to the credit company CR after reception of the normal termination signal.

The password corresponding suggestion information recording section 60 stores suggestion information for each password.

The line service database DB includes a fee table 61, operation change information table 62, and password corresponding work information record table 63.

Of these tables, the fee table 61 stores fee information for each item of operation, as shown in FIG. 21.

The operation change information table 62 is made up of an extension additional data table shown in FIG. 22, and a trunk additional data table shown in FIG. 23. The extension additional data table stores data indicating correspondence among the extension work number, extension number, extension group, and trunk used to originate a call. The trunk additional data table stores data indicating correspondence among the trunk work number, trunk number, trunk group, and extension pilot at the destination.

Figure 25:
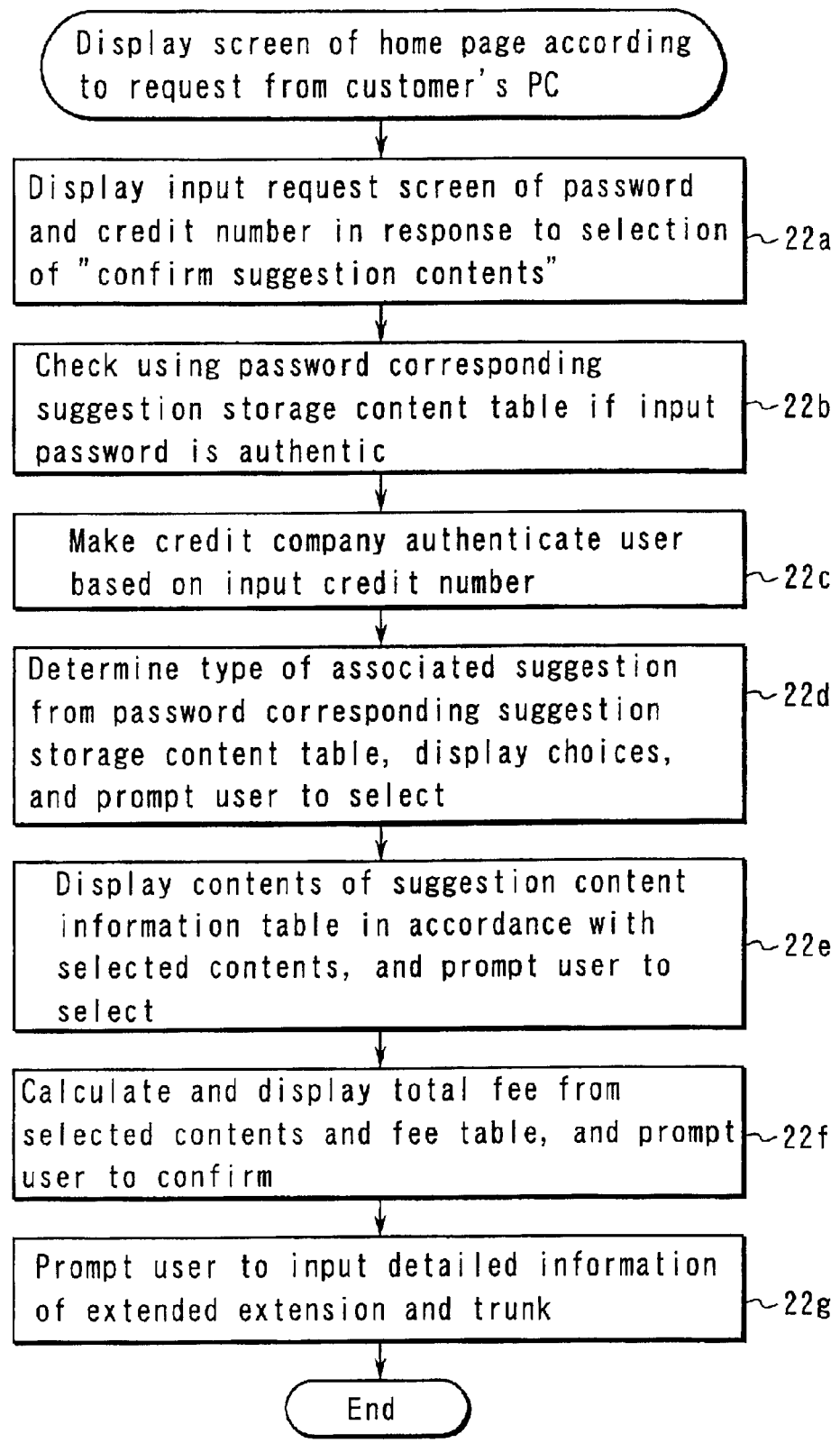
FIG. 25 is a flow chart showing the processing sequence and contents of a customer center upon determining suggestion contents in the system in the second embodiment of the present invention.

The password corresponding work information record table 63 stores data indicating correspondence among the password, customer number, scheduled work date, extension work number, and trunk work number, as shown in FIG. 25.

The processing operation of the support system with the above arrangement will be described below.

FIG. 25 is a flow chart showing the operation of the customer center CC.

Figure 26:
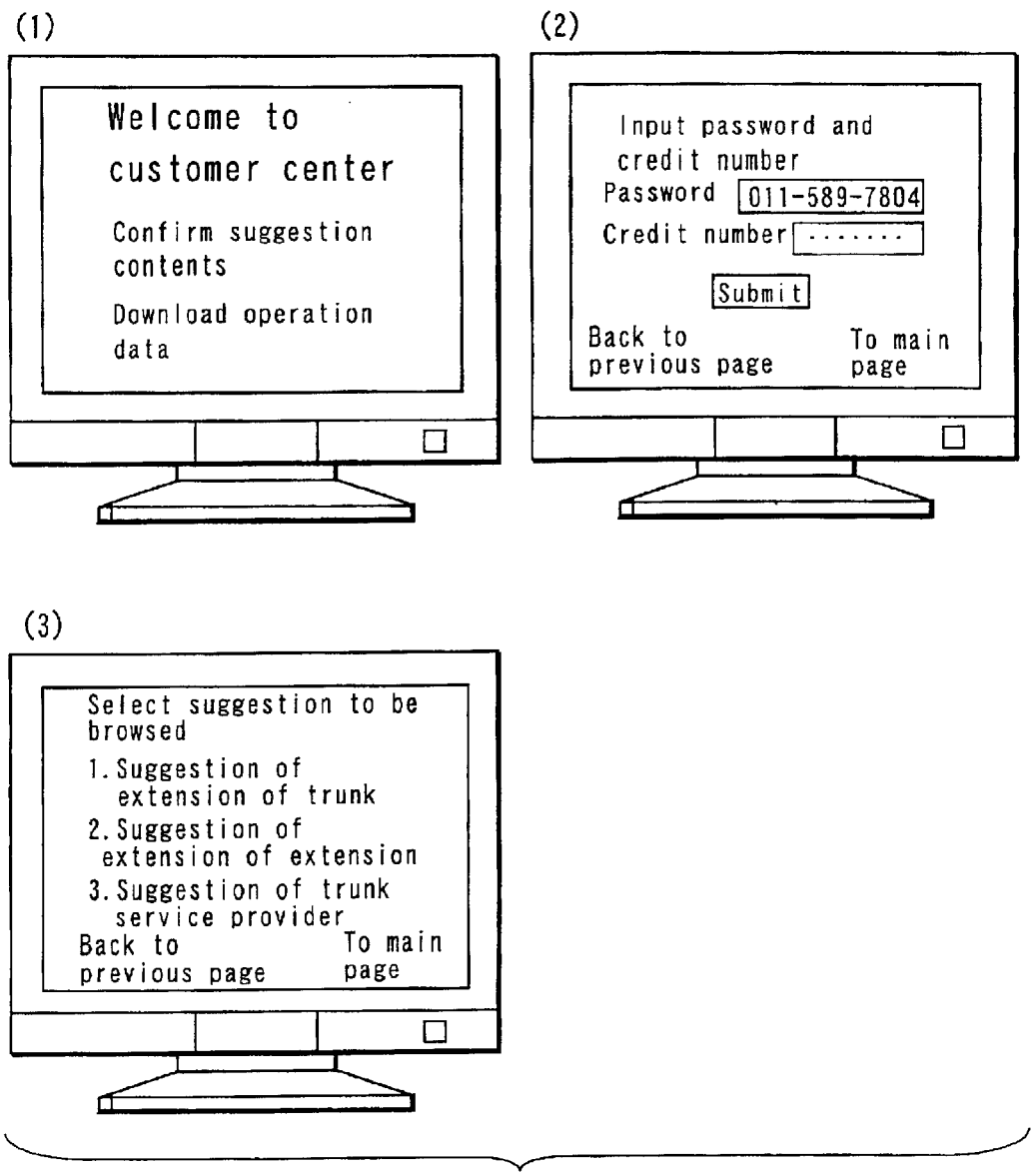
FIG. 26 shows an example of a display screen of suggestion contents provided by the customer center in a maintenance personal computer shown in FIG. 1.

More specifically, the customer center CC transmits screen information of the home page shown in FIG. 26(1) to the user in accordance with a user's request. If the user has selected "confirm suggestion contents", the customer center cc transmits input request screen information of the password and credit number shown in FIG. 26(2) (step 22a). If the user inputs a password using the maintenance personal computer PC, the customer center CC checks with reference to the storage contents of the password corresponding suggestion information recording section 60 if the input password is authentic (step 22b). If the password is authentic, the customer center CC accesses the credit company CR using the input credit number to check the authenticity of the user (step 22c). If the user is authentic, the customer center CC checks the type of associated suggestion on the basis of the password corresponding suggestion information recording section 60, displays a select screen shown in FIG. 26(3) on the maintenance personal computer PC, and prompts the user to select (step 22d). The customer center CC displays the contents of the suggestion content information table on the maintenance personal computer PC in accordance with the selected contents, as shown in FIGS. 27(4) and 27(5) and FIG. 28(6), and prompts the user to select (step 22e). If the contents of the suggestion content information table are selected, the customer center CC calculates the total fee on the basis of the selected contents and the storage contents of the fee table 61, displays a screen shown in FIG. 28(7), and prompts the user to confirm the selected contents (step 22f). Subsequently, the customer center CC displays a screen shown in FIG. 29(8) to prompt the user to input detailed information of the extended extension and trunk (step 22g). Upon completion of input, the customer center CC generates a new password, and displays an end screen shown in FIG. 29(9).

Figure 30:
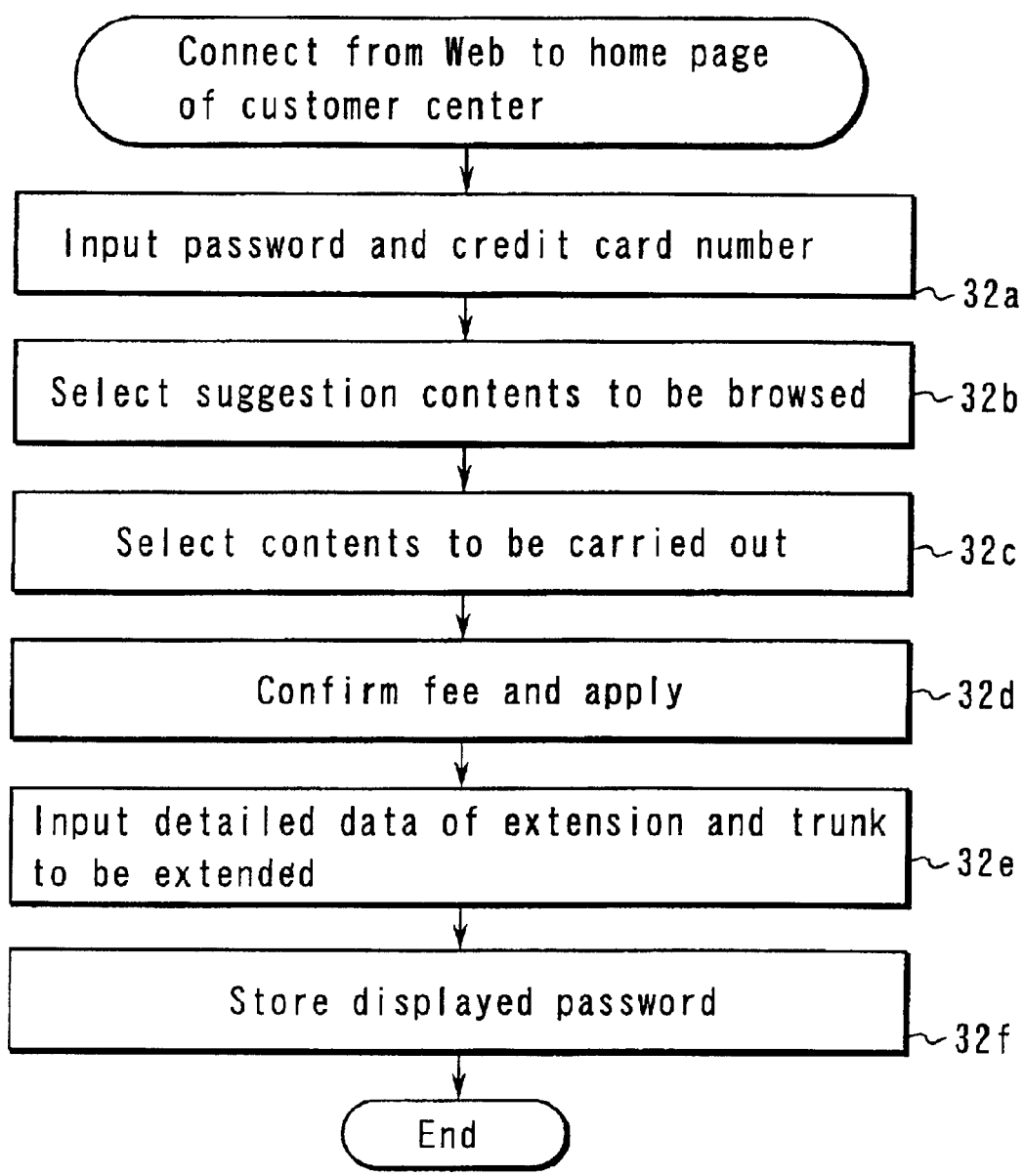
FIG. 30 is a flow chart showing the processing sequence and contents of the maintenance personal computer upon selecting suggestion contents in the system in the second embodiment of the present invention.

In response to the aforementioned processes of the customer center CC, the user makes input operation in accordance with the sequence in steps 32a to 32f shown in FIG. 30 using the maintenance personal computer PC.

Figure 31:
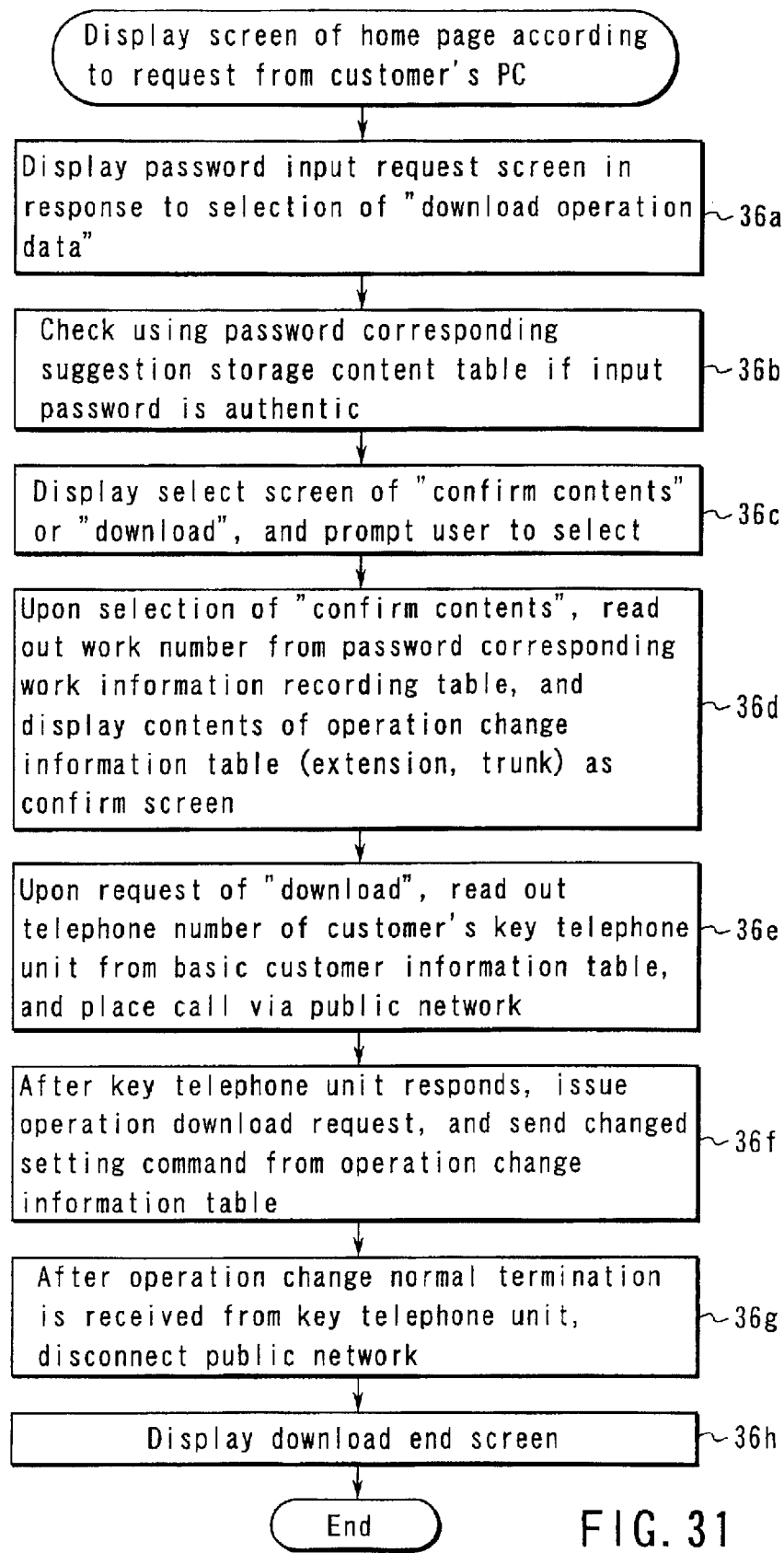
FIG. 31 is a flow chart showing the processing sequence and contents of the customer center upon downloading operation data in the system in the second embodiment of the present invention.

FIG. 31 is a flow chart showing the operation of the customer center CC upon downloading operation data.

Figure 32:
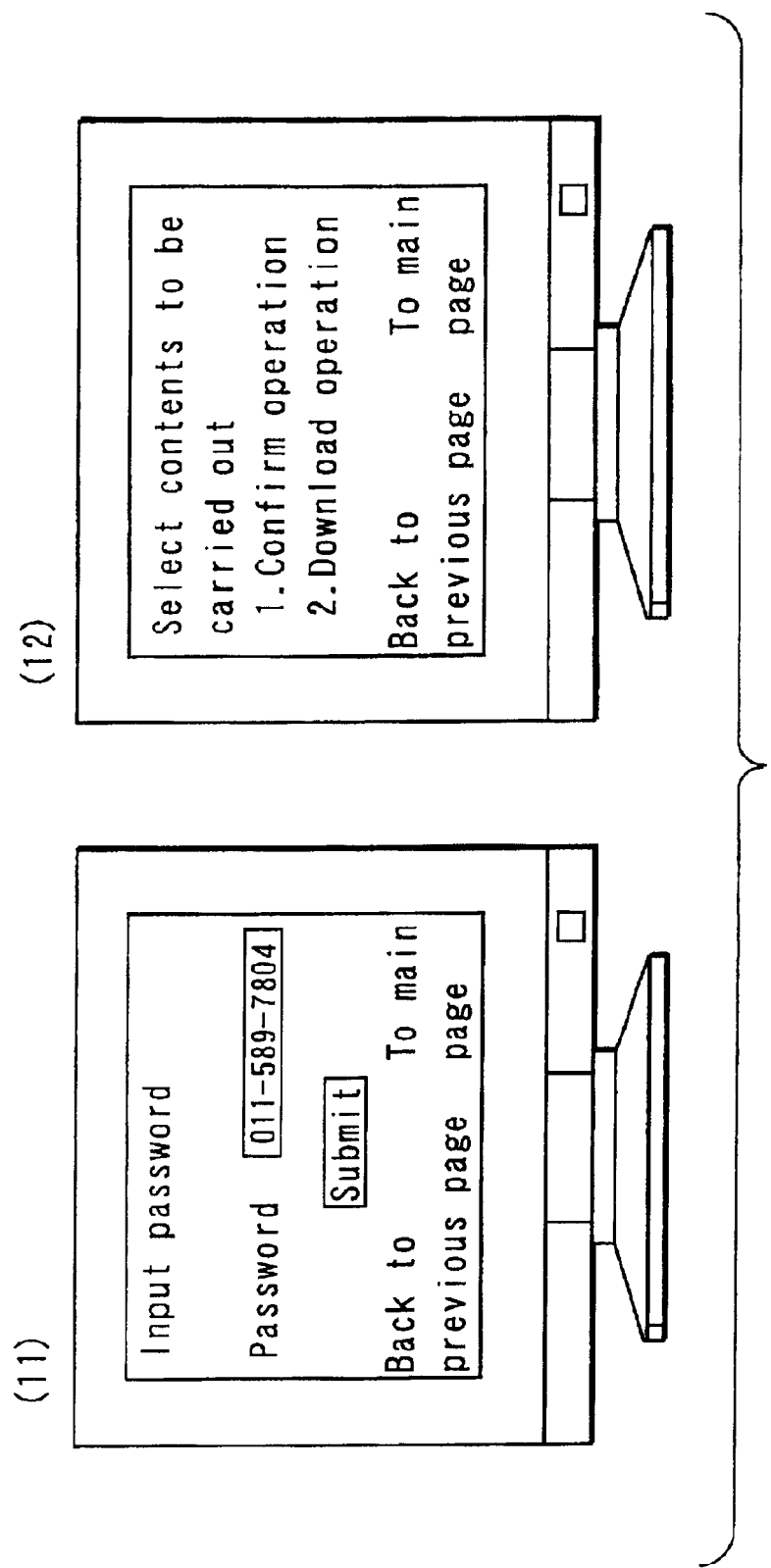
FIG. 32 shows an example of a display screen displayed upon downloading operation data in the maintenance personal computer shown in FIG. 1.

More specifically, when the user has selected downloading of operation data, the customer center CC transmits password input request screen information shown in FIG. 32(11) to the user's maintenance personal computer PC (step 36a). If the user inputs a password using the maintenance personal computer PC, the customer center CC checks on the basis of the storage contents of the password corresponding work information record table 63 if the input password is authentic (step 36b). If the password is authentic, the customer center CC transmits select screen information of "confirm operation contents" or "download" shown in FIG. 37(12) to the user's maintenance personal computer PC to display it, thus prompting the user to select one of them (step 36c). If the user selects "confirm operation contents", the customer center CC displays the contents of the operation change information table on the maintenance personal computer PC, as shown in FIG. 33(13) (step 36d). On the other hand, if the user requests downloading, the customer center CC reads out the customer's telephone number from the basic customer information table, and accesses the user's key telephone unit BT on the basis of the readout telephone number via the public network PNW (step 36e). After a response is received from the key telephone unit BT, the customer center CC transmits an operation command to the key telephone unit BT (step 36f). After an operation change normal termination signal is received from the key telephone unit BT, the customer center CC disconnects the line with the key telephone unit BT (step 36g), and transmits download end screen information shown in FIG. 33(14) to the user's maintenance personal computer PC (step 36h).

Figure 34:
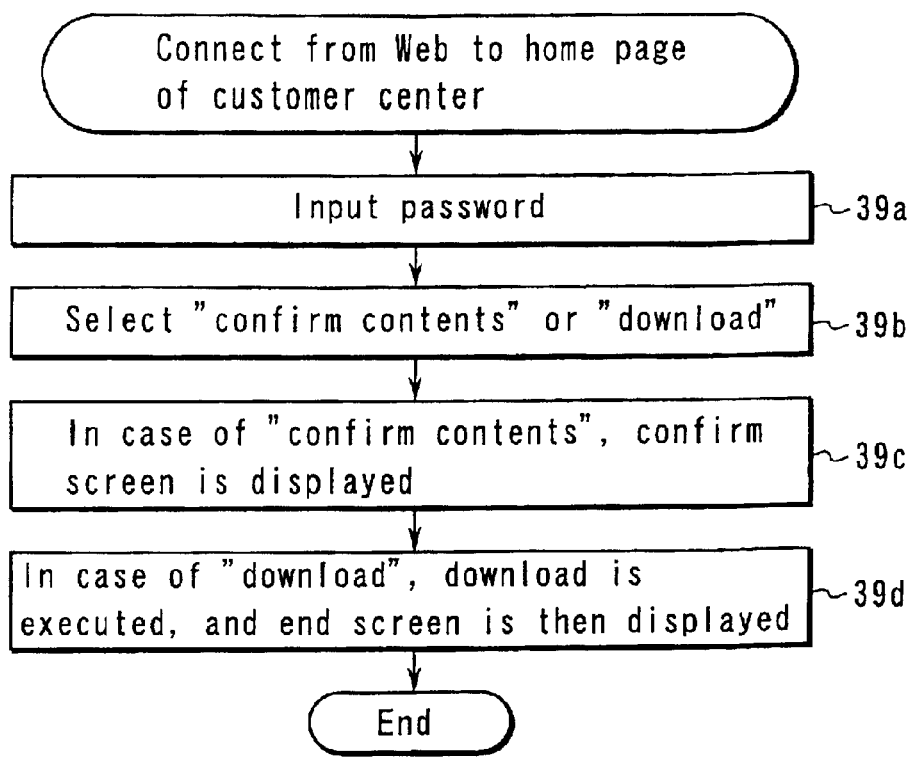
FIG. 34 is a flow chart showing the processing sequence and contents of the maintenance personal computer upon downloading operation data in the system in the second embodiment of the present invention.
Figure 35:
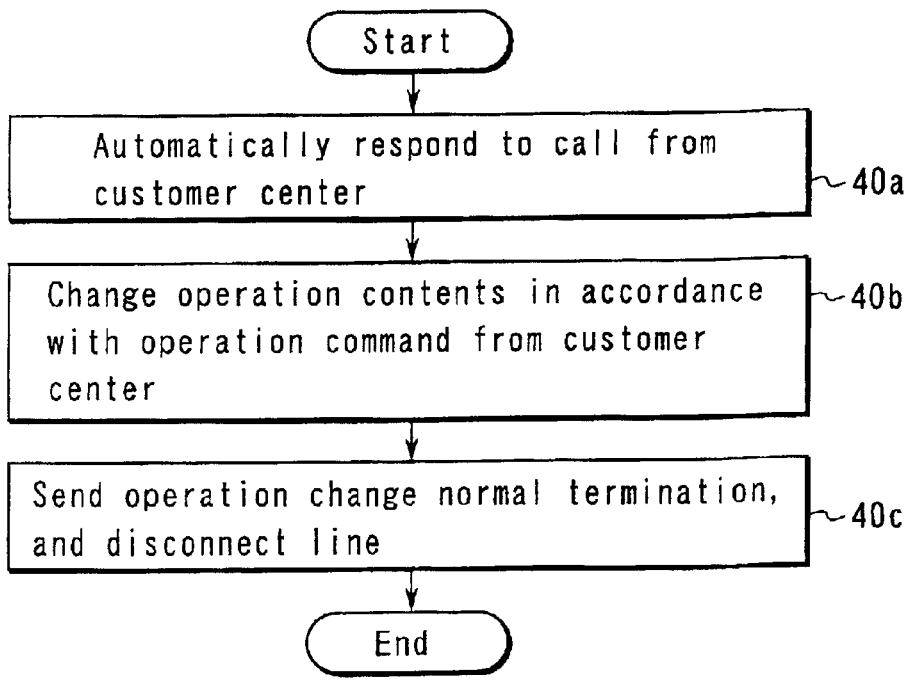
FIG. 35 is a flow chart showing the processing sequence and contents of the key telephone unit upon downloading operation data in the system in the second embodiment of the present invention.

In response to the aforementioned processes of the customer center CC, the user makes input operation in accordance with the sequence in steps 39a to 39d shown in FIG. 34 using the maintenance personal computer PC. On the other hand, the key telephone unit BT changes the contents of operation data stored therein in accordance with the sequence in steps 40a to 40c shown in FIG. 35 in response to the operation command received from the customer center CC.

As described above, according to the service providing method of the second embodiment, processes from the operation data change request input by the user until new operation data used to set the user's key telephone unit BT to have an optimal inside comprise are automatically executed via the Internet INW and public network PNW. Therefore, the user need only select the inside comprise of the key telephone unit BT suggested by the customer center CC to receive new operation data corresponding to the selected inside comprise within a short period of time and with low cost and to rewrite old operation data on the basis of the new operation data.

In the second embodiment, the customer center CC transmits an operation command containing new operation data to the corresponding key telephone unit BT after it receives a password assigned in advance to the user system CM from the user system CM. Hence, providing wrong operation data or providing operation data to an unauthentic user can be prevented.

Furthermore, in the second embodiment, since the customer center CC and credit company CR are connected, an amount required to change operation data can be automatically settled between the customer center CC and credit company CR using the communication network. Moreover, using the user's credit number possessed by the credit company CR, not only the balance of the account, expiration date, and the like, but also the presence/absence of the user himself or herself can be checked prior to service implementation. In this way, the authenticity of the user can be checked in advance.

In the second embodiment, when the customer center CC transmits new operation data to the key telephone unit BT, the old operation data is automatically changed to new operation data. Alternatively, the new operation data may be saved in another memory, and the old operation data may be rewritten as needed.

(Third Embodiment)

The third embodiment relates to the user system CM, customer center CC, credit company CR, work agent AO, and parts factory BO shown in FIG. 1.

Figure 36:
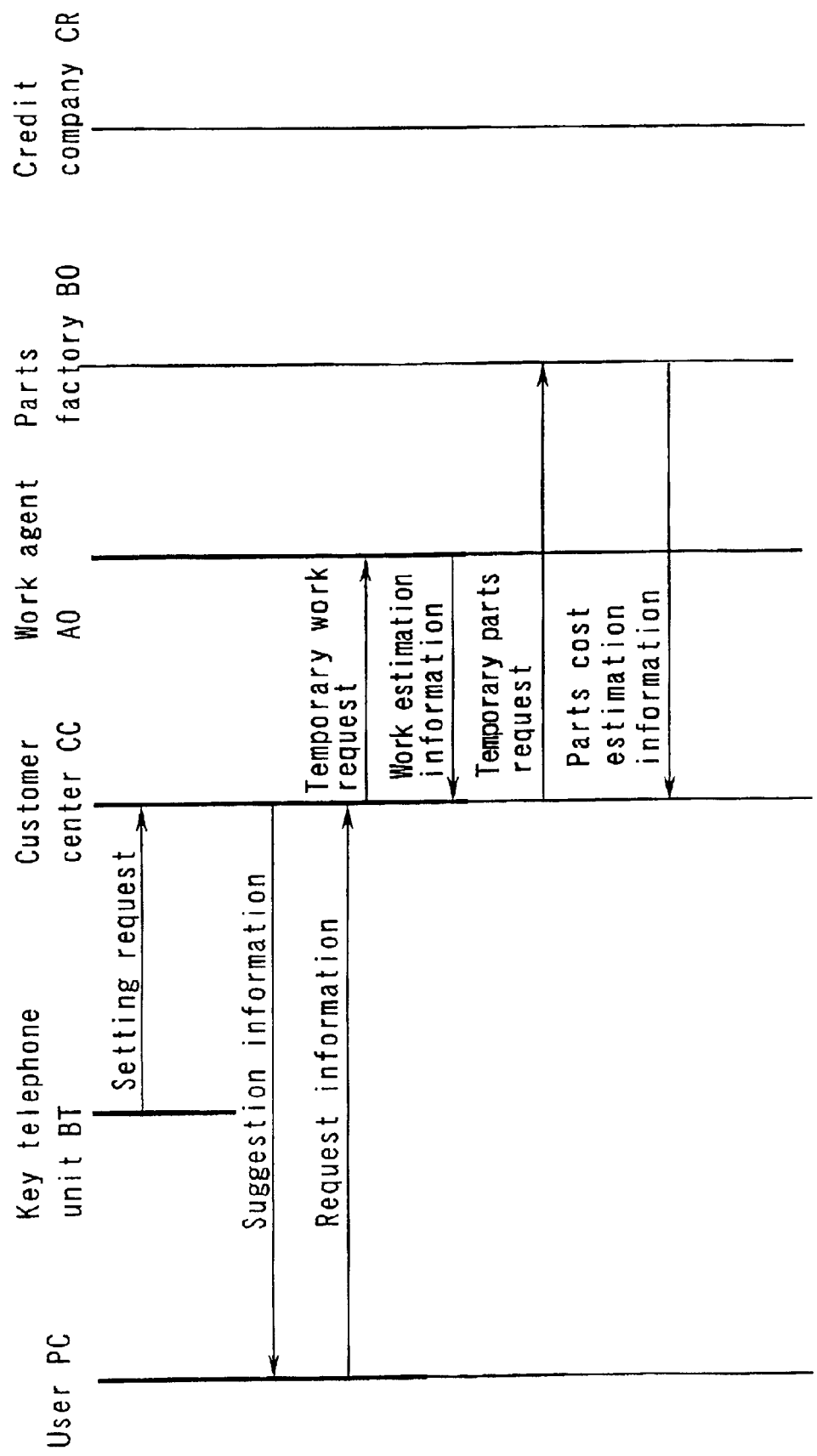
FIG. 36 is a sequence chart for explaining an outline of a service providing method in the third embodiment of the present invention.
Figure 37:
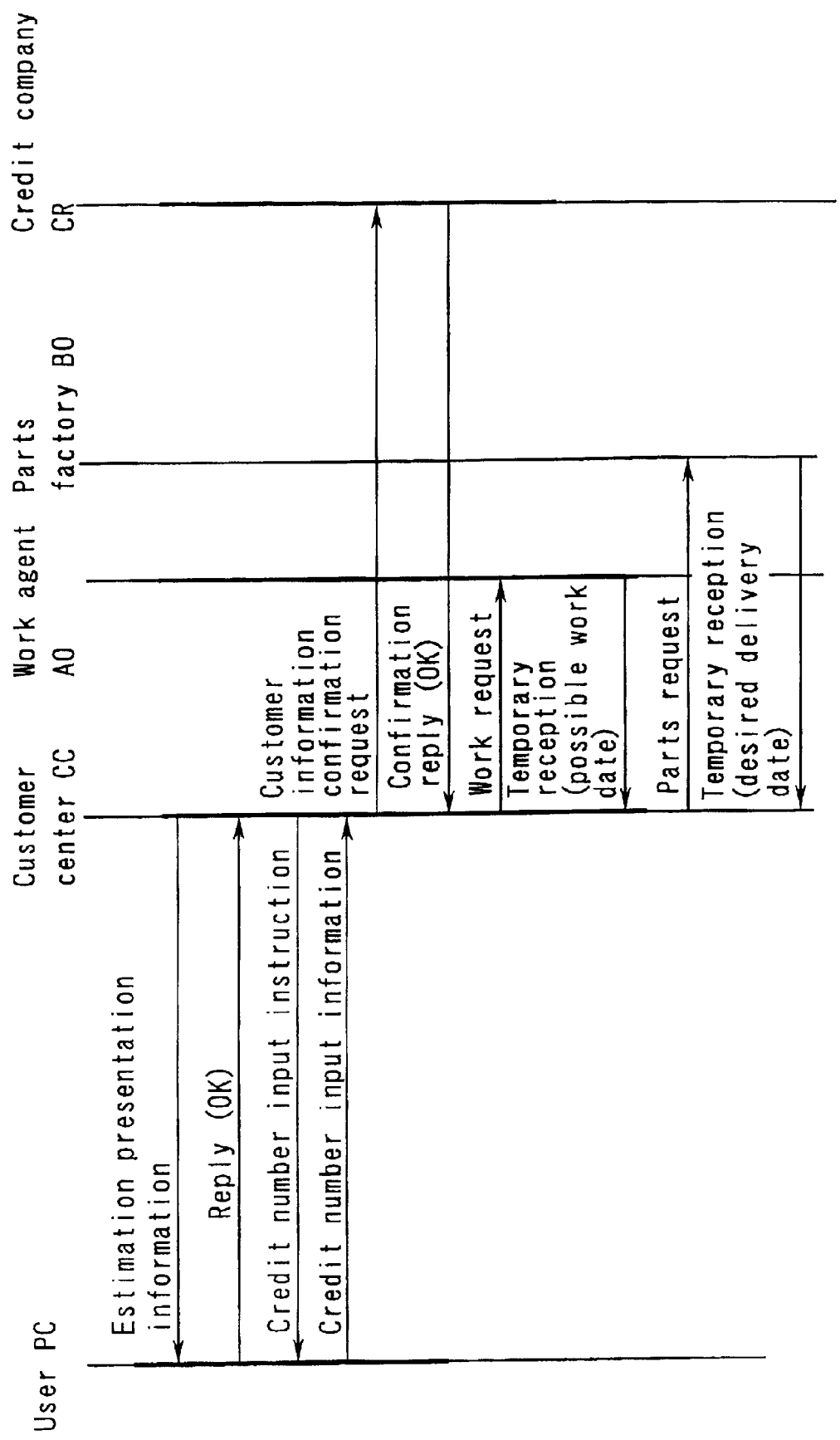
FIG. 37 is a sequence chart for explaining an outline of the service providing method in the third embodiment of the present invention.
Figure 38:
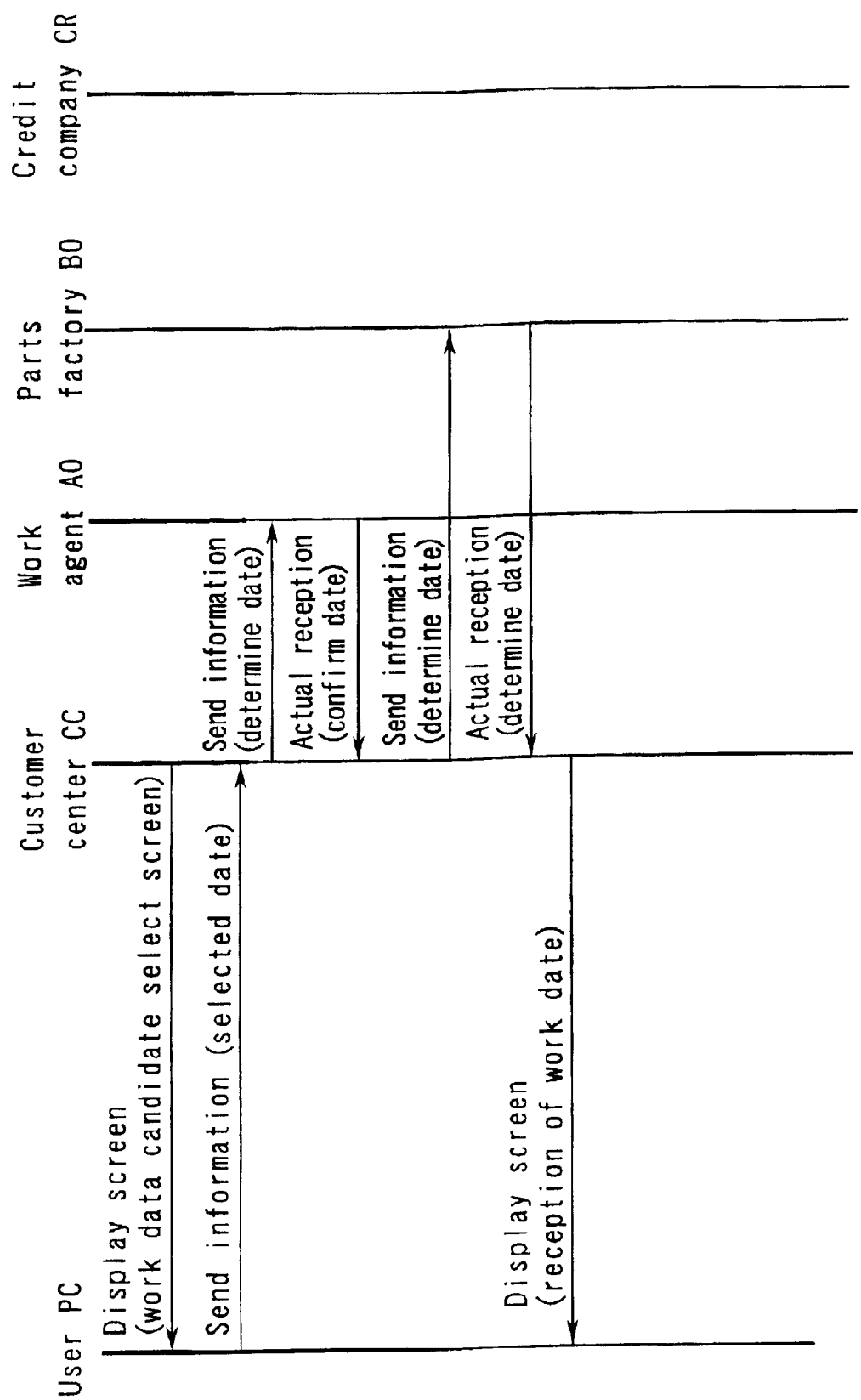
FIG. 38 is a sequence chart for explaining an outline of the service providing method in the third embodiment of the present invention.

FIGS. 36 to 38 are sequence charts for explaining the processing sequence between the user system CM and customer center CC upon extending a line unit of the key telephone unit BT in the third embodiment.

That is, when the key telephone unit BT in the user system CM requires to extend a line unit, it automatically accesses the customer center CC via the public network PNW, and transmits a setting request which contains information indicating a line unit to be extended, and the mail address of the maintenance personal computer PC.

The customer center CC generates suggestion information required to change or extend the line unit on the basis of the information indicating the line unit, which is contained in the setting request, and transmits that information to the user's maintenance personal computer PC via the Internet INW on the basis of the mail address contained in the setting request.

The user examines the suggestion contents sent from the customer center CC. If the user agrees with the contents, he or she transmits request information to the customer center CC via the Internet INW using the maintenance personal computer PC.

Then, the customer center CC transmits a temporary request of an extension work of the line unit of the key telephone unit BT to the work agent AO via the dedicated line on the basis of the contents of the received request information. In response to this temporary request, the work agent AO calculates cost required for the work, and transmits the calculation result to the customer center CC as work cost estimation information.

Also, the customer center CC transmits a temporary request of order of the line unit of the key telephone unit BT to the parts factory BO via the dedicated line on the basis of the contents of the received request information. In response to this temporary request, the parts factory BO calculates the price of the ordered line unit, and transmits the calculation result to the customer center CC as parts cost estimation information.

The customer center CC transmits the work cost estimation information and parts cost estimation information received from the work agent AO and parts factory BO to the user's maintenance personal computer PC as the request source via the Internet INW.

The user who has accepted the contents of the work cost estimation information and parts cost estimation information transmits back a reply to the customer center CC via the Internet INW using the maintenance personal computer PC.

Upon receiving this reply, the customer center CC prompts the user to input required information (password, credit number, and the like) via the Internet INW.

Upon completion of input of the required information, the maintenance personal computer PC transmits the information to the customer center CC.

Upon receiving the information, the customer center CC checks the authenticity of the user using the password. If the user is authentic, the customer center CC accesses the credit company CR via the dedicated line, and inquires of the credit company CR about the credit history of the user. In response to this inquiry, the credit company CR checks the presence/absence of an account corresponding to the credit number, if the credit term has not expired, and if use suspension is not set. Then, the credit company CR returns a reply to the customer center CC.

On the basis of the reply from the credit company CR, the customer center CC checks the credit history of the user. If no problem is found, the customer center CC requests the work agent AO to conduct a change or extension work of the line unit with respect to the key telephone unit BT of the request source. At the same time, the customer center CC places an order of the line unit to the parts factory BO.

Subsequently, the customer center CC determines a schedule on the basis of the contents obtained from the work agent AO and parts factory BO, and accesses the maintenance personal computer PC to inform it of a work date.

Upon receiving a confirmation reply from the user in response to that message, the customer center CC transmits a final order confirmation to the work agent AO and parts factory BO according to the schedule and the like.

Upon completion of the change or extension work of the line unit in the key telephone unit BT, the customer center CC and credit company CR execute a settlement process for transferring an amount required to change or extend the unit from the user's account via the dedicated line.

Note that the arrangement of the key telephone unit BT that implements the aforementioned method is as follows.

Figure 39:
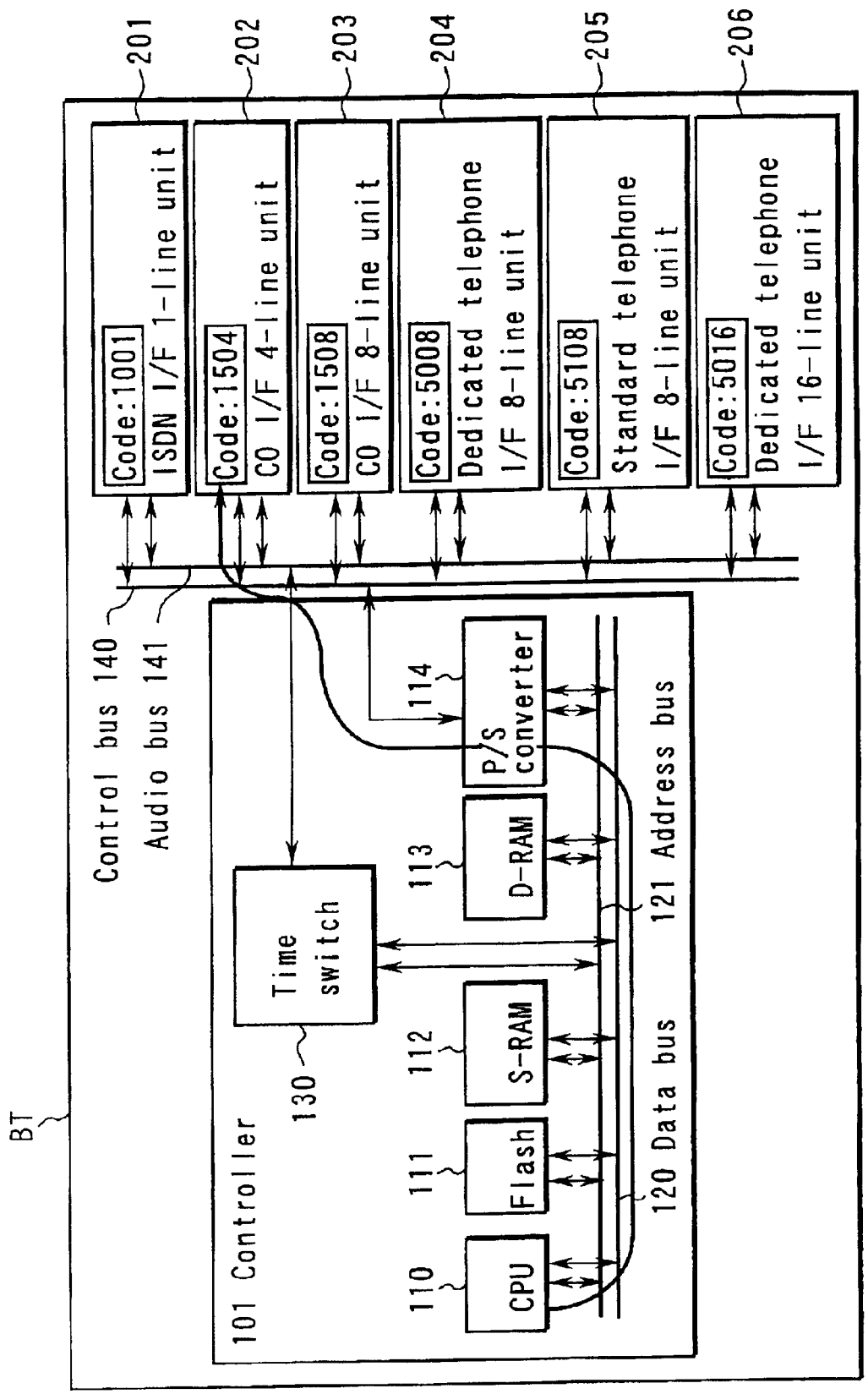
FIG. 39 is a block diagram showing the arrangement of principal part of a key telephone unit BT in the third embodiment of the present invention.

FIG. 39 is a block diagram showing the arrangement of principal part of the key telephone unit BT.

The key telephone unit BT comprises a controller 101, and a plurality of line units 201 to 206, which are connected to each other via a control bus 140 and audio bus 141. Note that each of the line units 201 to 206 is assigned a unit code used to identify the self unit.

Office lines such as a public line, dedicated lines, and the like are connected to the line units 201 to 203 of the aforementioned line units as needed. The line units 201 to 203 execute office line interface operations associated with the office lines connected.

Extension terminals are connected to the line units 204 to 206 as needed. The line units 204 to 206 execute office line interface operations associated with the extension terminals connected.

The controller 101 comprises a CPU 110, flash memory (FLASH) 111, S-RAM 112, D-RAM 113, P/S converter 114, and time switch 130, which are connected via address bus 121 and data bus 120.

The CPU 110 systematically controls the respective units of the key telephone unit BT on the basis of control data stored in the flash memory 111, D-RAM 113, and S-RAM 112 to implement operations as the key telephone unit BT.

The flash memory 111 is a known device which has a plurality of storage blocks which can store data of given sizes (which need not be a constant size), can write stored data for respective storage blocks, and stores control program data and the like used by the CPU 110.

The D-RAM 113 temporarily stores various data required when the CPU 110 executes various processes. The S-RAM 112 stores customer data, system setup data, and the like. In this embodiment, the S-RAM 112 stores information indicating unit types and the number of lines in correspondence with unit codes used to identify the line units 201 to 206, as shown in FIG. 40.

The P/S converter 114 exchanges data with the control bus 140.

The time switch 130 replaces time slots on the audio bus 141 under the control of the CPU 110, thus arbitrarily exchanging and connecting the line units 201 to 206 to each other.

The processing operation of the key telephone unit BT with the above arrangement will be described below.

Figure 41:
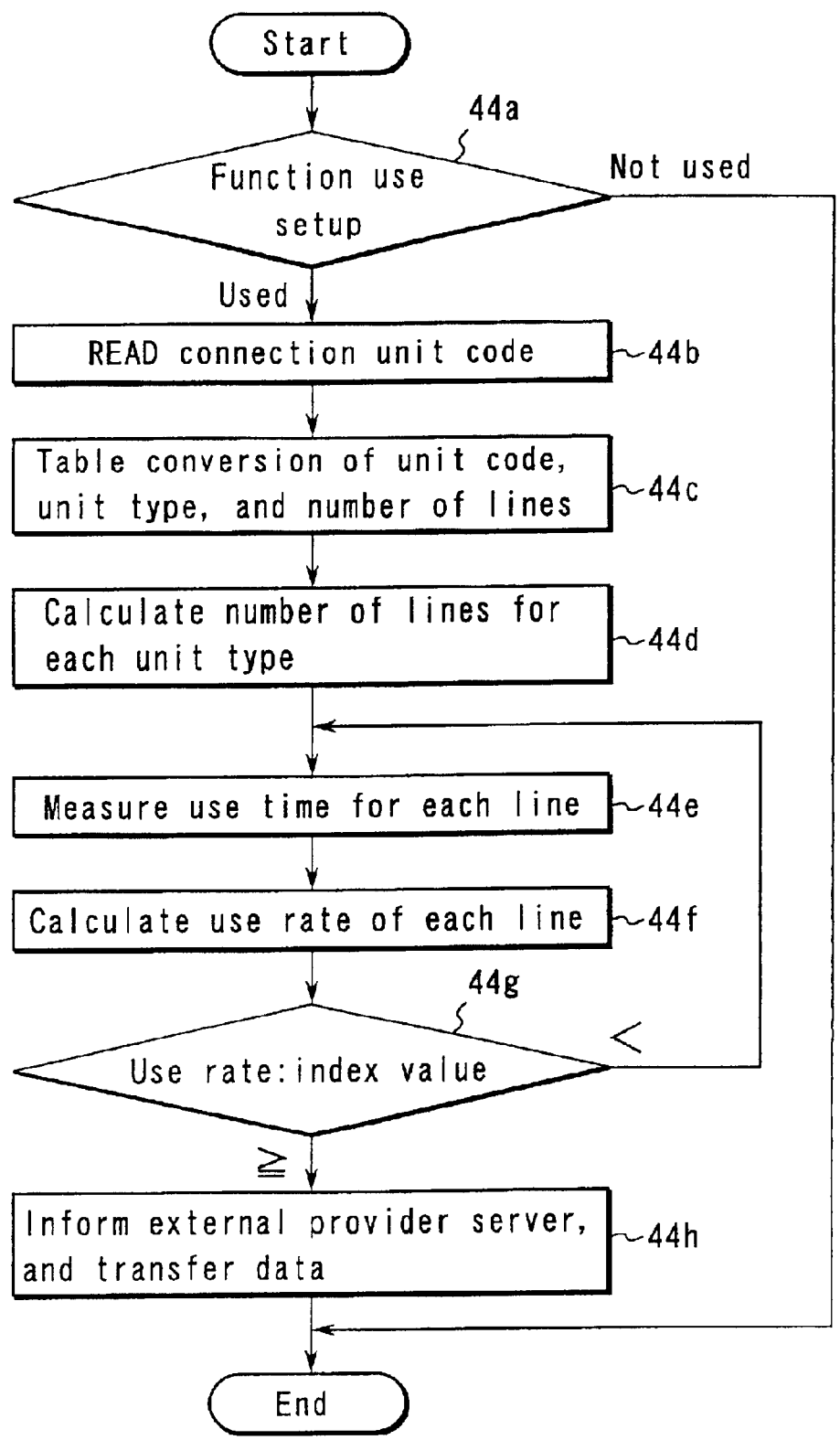
FIG. 41 is a flow chart showing the processing sequence and contents of the key telephone unit in the system in the third embodiment of the present invention.

FIG. 41 is a flow chart showing the operation of the key telephone unit BT.

The CPU 110 executes a known operation process on the basis of the control program data stored in the flash memory 111, and checks if the line unit is used (step 44*a*).

If it is determined that the line unit is used, the CPU 110 sequentially reads out the unit codes from the line units 201 to 206 (step 44*b*), looks up the storage contents of the S-RAM 112 on the basis of each unit code, and sequentially executes processes in steps 44*d* to 44*f* on the basis of the look-up result.

The CPU 110 measures the use time for each line. This time can be calculated from communication start and end times used in fee management. The calculated times are totaled for respective line types, thus obtaining the gross use times for respective line types. By making the following arithmetic operation using these values, a use rate for each line can be calculated:

$$(\text{the line use rate}) = \frac{(\text{the gross use times})}{(\text{use time for each line}) \times (\text{line number})}$$

If it is determined in step 44g that the use rate of any line type has exceeded a pre-set index value, the CPU 110 automatically transmits a message indicating this to the customer center CC via the public network PNW using an external server connection function of the key telephone unit BT (step 44h). As for the use rates, identical values may be used or different values may be used for respective lines. In this case, information that specifies the user, the unit comprise of the key telephone unit BT, unit type, and use rate data are sent together. Whether this function is enabled/disabled can be easily set by a program, and this function is enabled in response to a user's request in advance.

After that, the customer center CC generates an estimation which contains a unit extension plan and attachment work cost for the user on the basis of the information sent from the key telephone unit BT by a program installed in advance, and automatically transmits that estimation as an e-mail message. The mail address of the user is recorded in the server of a provider upon receiving the user's request in advance.

The arrangement of the maintenance personal computer PC, customer center CC, and line service database DB, which implement the aforementioned method, is as follows.

Figure 42:
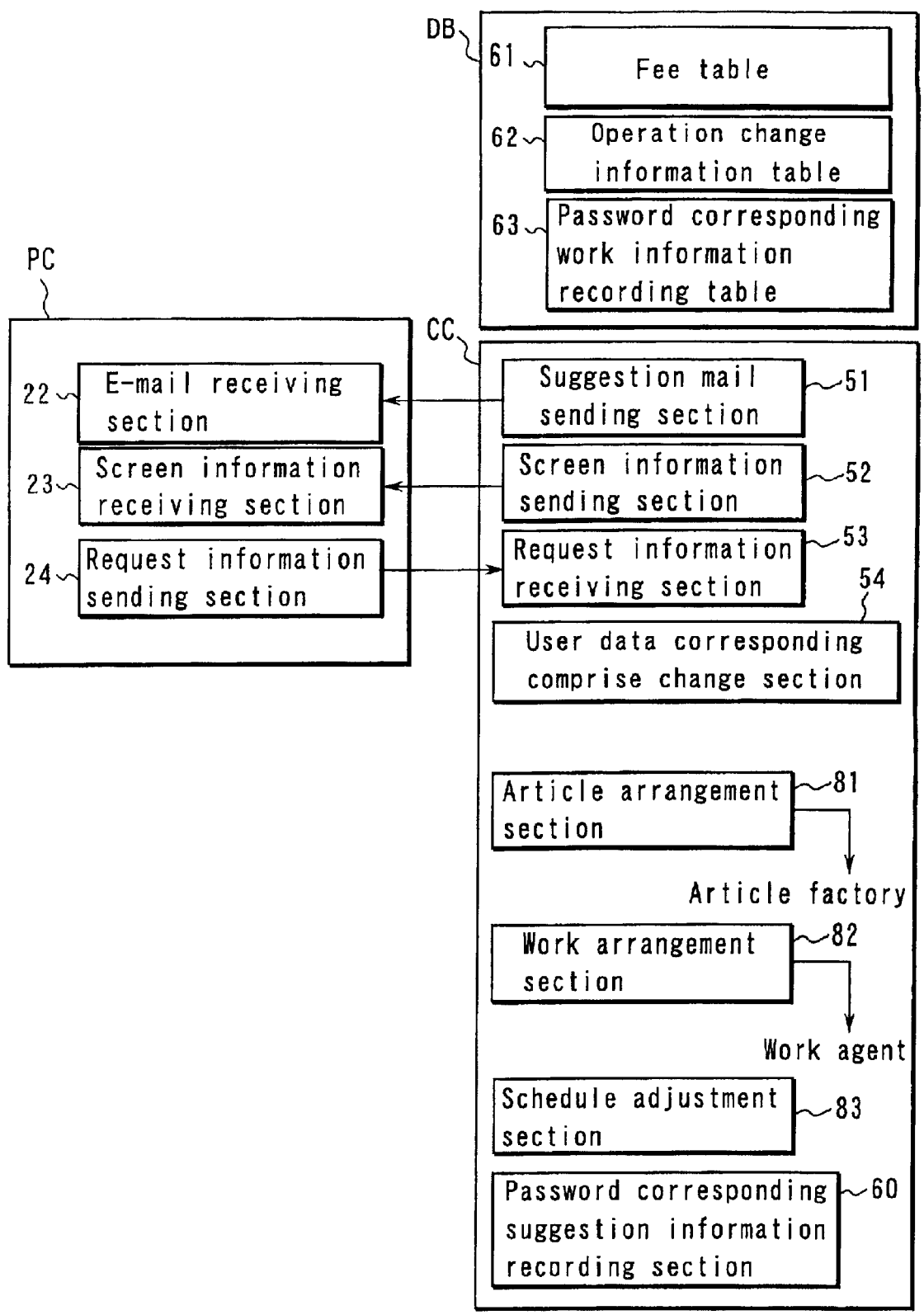
FIG. 42 is a block diagram showing the arrangement of principal part of a maintenance personal computer, customer center, and line service database in the third embodiment of the present invention.

FIG. 42 is a block diagram showing the functional arrangement of the maintenance personal computer PC, customer center CC, and line service database DB. Note that the same reference numerals in FIG. 42 denote the same parts as in FIG. 20, and a detailed description thereof will be omitted.

That is, the customer center CC additionally comprises an article arrangement section 81 for transmitting an article arrangement request to the parts factory BO, a work arrangement section 82 for transmitting a work arrangement request to the work agent AO, and a schedule adjustment section 83 for adjusting a schedule.

The processing operations of the maintenance personal computer PC and customer center CC with the above arrangement will be described below.

Figure 43:
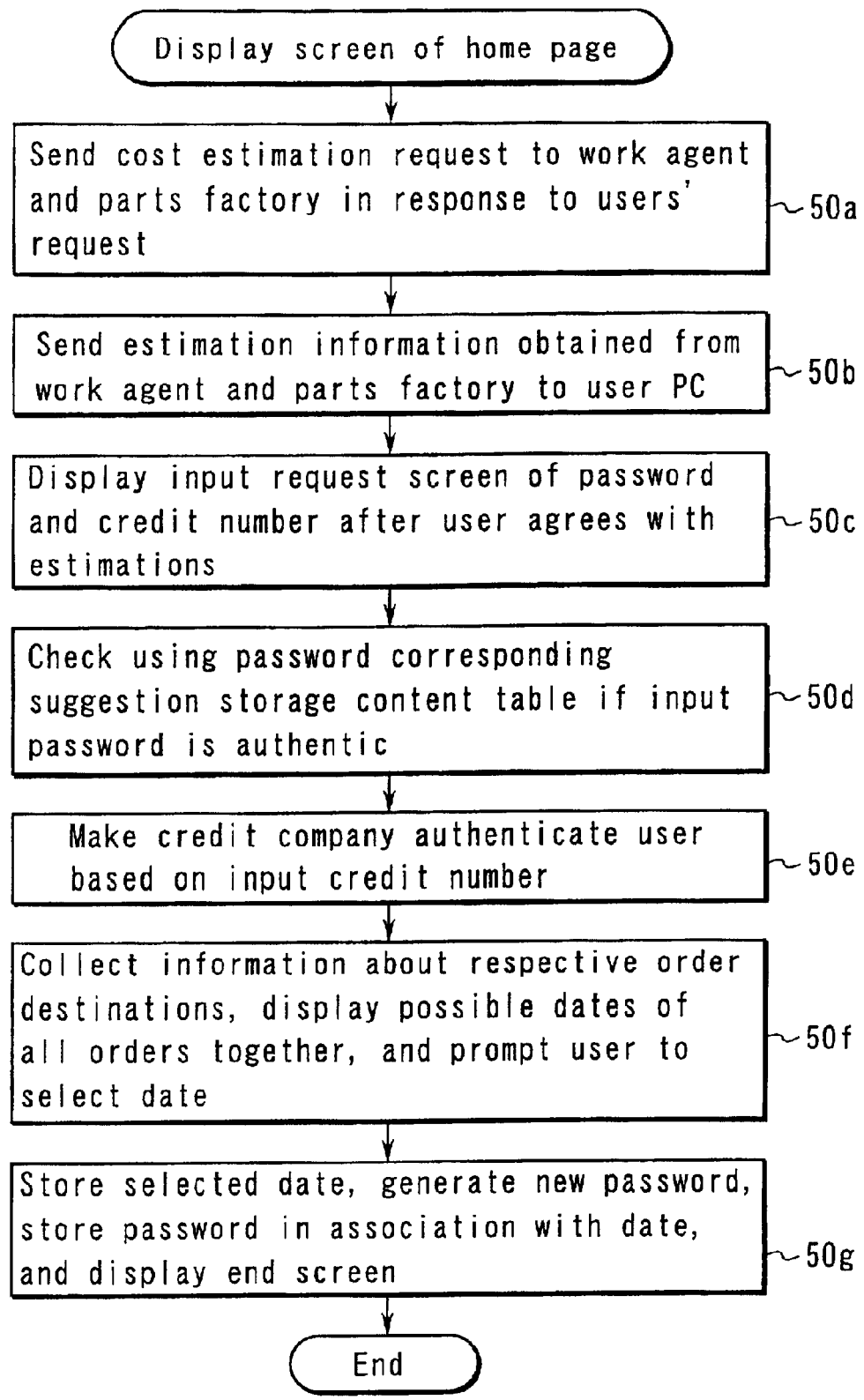
FIG. 43 is a flow chart showing the processing sequence and contents of the customer center in the system in the third embodiment of the present invention.

FIG. 43 is a flow chart showing the operation of the customer center CC.

More specifically, upon receiving a message indicating that the use rate of a given line unit has exceeded an index value from the key telephone unit BT, the customer center CC transmits screen information of its home page to the maintenance personal computer PC, and also transmits line unit extension suggestion screen information to the maintenance personal computer PC. When the user has selected an extension request of a line unit, the customer center CC requests the work agent AO and parts factory BO to estimate cost (step 50a). Upon receiving estimation information from the work agent AO and parts factory BO in response to that request, the customer center CC transmits the estimation information to the maintenance personal computer PC (step 50b).

Upon receiving information indicating that the user has agreed with the estimations, the customer center CC transmits input request screen information of a password and credit number to the maintenance personal computer PC (step 50c). If the user inputs a password using the maintenance personal computer PC, the customer center CC checks on the basis of the storage contents of the password corresponding suggestion information recording section 60 if the password is authentic (step 50d). If the password is authentic, the customer center CC accesses the credit company CR to check user authenticity (step 50e). If the user is authentic, the customer center CC collects information about the work agent AO and parts factory BO as order destinations, displays a screen shown in FIG. 44, which shows possible dates for all orders, and prompts the user to select a desired date (step 55f). The customer center CC stores the selected date, generates a new password, and displays an end screen (step 50g).

Figure 45:
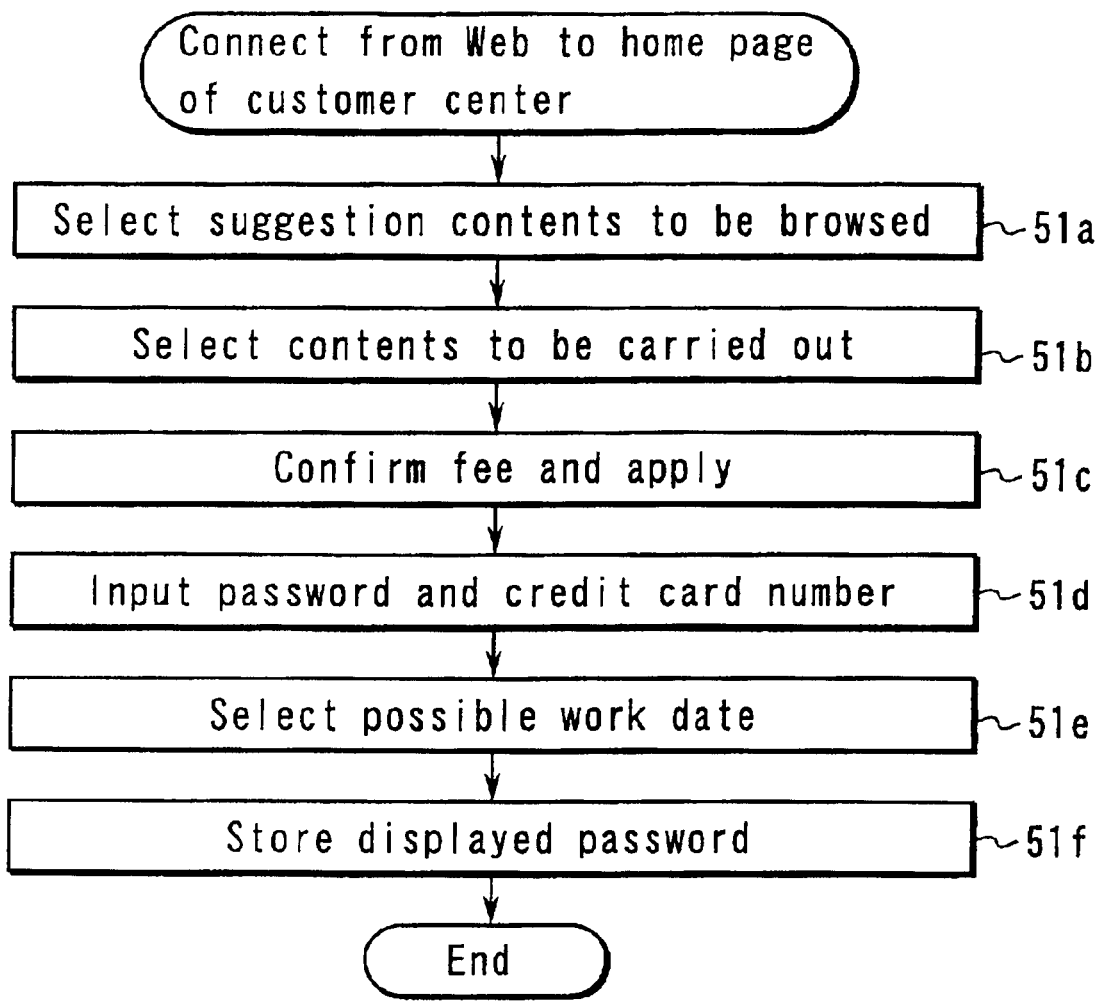
FIG. 45 is a flow chart showing the processing sequence and contents of the maintenance personal computer in the system in the third embodiment of the present invention.

In response to the aforementioned processes of the customer center CC, the user makes input operation in accordance with the sequence in steps 51a to 51f shown in FIG. 45 using the maintenance personal computer PC.

In the service providing method of the third embodiment, when it is determined in the key telephone unit BT if the use rate of each of the line units 201 to 206 has exceeded a reference value, a setting request which contains information indicating, e.g., the line section 201 whose use rate has exceeded the reference value, and the mail address assigned to the user who possesses this key telephone unit BT is automatically sent to the customer center CC. The customer center CC analyzes the type, use frequency, and the like of the line section 201 on the basis of the setting request contents received from the key telephone unit BT, generates suggestion information required to issue a change or extension request from the analysis result, and transmits the suggestion information to the corresponding user system CM via the Internet INW on the basis of the mail address contained in the setting request.

For this reason, since the user need not always monitor the use conditions and operation states of the line units 201 to 206 of the key telephone unit BT, and line unit change or extension suggestion contents are automatically sent from the customer center CC before any trouble occurs upon operation of the key telephone unit BT, great laborsaving can be attained, and the key telephone unit BT can be used according to the user's needs. On the other hand, the customer center CC can offer a unit change or extension suggestion according to the user's needs and use conditions while greatly reducing cost and labor.

When the parts factory BO and work agent AO are connected to the customer center CC via a communication network, the user need only transmit a line unit extension or change request to the customer center CC, which automatically arranges parts exchange and a work for the key telephone unit BT. For this reason, the user need not arrange agents, thus improving the use efficiency of the service. Furthermore, since the customer center CC determines a date when the work agent AO and parts factory BO can be arranged at the same time, the line unit of the key telephone unit BT can be extended or changed within a short period of time for the user.

Furthermore, according to the third embodiment, upon receiving the line unit change or extension request from the user, the customer center CC checks not only the balance of the account, expiration date, and the like, but also the presence/absence of the user himself or herself using the user's credit number possessed by the credit company CR prior to requests to the work agent AO and parts factory BO. In this manner, user authenticity can be checked in advance, and if it is determined on the basis of the checking result that the user is authentic, the customer center CC automatically requests the work agent AO and parts factory BO to change or extend a unit according to the request contents. Hence, the user need not contact the work agent AO and parts factory BO for the purpose of requests while observing the suggestion information, and the line unit of his or her key telephone unit BT can be extended or changed within a short period of time for the user.

(Another Embodiment)

In the first embodiment, the customer center CC accesses the key telephone unit BT using user information stored in the line service database DB to acquire communication log information and operation data. However, the present invention is not limited to this. For example, the customer center CC may acquire communication log information alone, may check communication traffic of the key telephone unit BT on the basis of this communication log information, and may generate suggestion information of an inside comprise. Alternatively, the customer center CC may periodically access the key telephone unit BT of the user system that has been contracted in advance without using user information stored in the line service database DB, so as to acquire communication log information.

In the second and third embodiments, upon providing a service from the customer center CC, the user submits his or her credit number. However, the present invention is not limited to this. For example, the credit number may be stored in the line service database DB in correspondence with the user ID, and the customer center CC may access the line service database DB on the basis of the user ID sent from the user to acquire the credit number. In this way, since the user's credit number need only be submitted only when user information is registered in the line service database DB, the credit number can be avoided from being hacked on the communication network upon transmitting a request, thus improving security.

In addition, the service suggestion and operation data change sequences and contents, the arrangement and operation contents of the support system, the type of electronic device, and the like can be variously modified within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of providing a user system a new service associated with an electronic device in said user system in accordance with information being communicated through a communication network, between said user system and a customer center for carrying out an operation support business for said electronic device, said electronic device storing communication log information and operation data, executing a predetermined communication process on the basis of the operation data, said method comprising:
   causing said customer center to access said electronic device through said communication network at a predetermined interval, to acquire the communication log information stored in said electronic device;
   causing said customer center to judge a communication traffic condition on the basis of said communication log information, to generate a judgment result;
   causing said customer center to determine a new inside configuration of said electronic device on the basis of said judgment result; and
   transmitting configuration information indicative of suggested contents of said inside configuration, from said customer center to said user system through said communication network.

2. A method according to claim 1, wherein transmitting said configuration information includes transmitting an access information required to browse said configuration information from said customer center to said user system via said communication network, and transmitting said configuration information to said user system via said communication network on the basis of said access information when said access information is transmitted from said user system that received the access information to said customer center.

3. A method according to claim 1, further comprising:
   transmitting a change request which contains selection contents of said inside configuration and subscriber information allocated from said communication network to said electronic device, from said user system to said customer center; and
   causing said customer center to generate a new operation data on the basis of said selection contents contained in said change request received from said user system, and to transmit said new operation data to said electronic device via said communication network on the basis of said subscriber information contained in said change request.

4. A method according to claim 3, further comprising causing said electronic device to rewrite said operation data stored in said electronic device to said new operation data, when said electronic device receives said new operation data from said customer center.

5. A method according to claim 3, wherein said transmitting said new operation data includes causing said customer center to transmit said new operation data to said electronic device, when said customer center receives access information, which is allocated in advance to said user system.

6. A method according to claim 3, wherein said method is applied to a system in which said customer center and a charge settlement institution are adapted to be connected via a communication network, and wherein said method further comprises:
   transmitting a user's account identification information from said user system to said customer center; and
   executing a settlement process for transferring an amount required to provide said new operation data from a user's account between said customer center and said charge settlement institution via said communication network on the basis of said user's account identification information, after said new operation data is transmitted to said electronic device of said user system.

7. A method according to claim 3, wherein said method is applied to a system in which said customer center and a charge settlement institution are adapted to be connected via a communication network, and wherein said method further comprises:
   transmitting a user's account identification information from said user system to said customer center;
   causing said customer center to inquire of said charge settlement institution about authenticity of the user via said communication network on the basis of the received user's account identification information, to generate a inquiry result; and
   causing said customer center to check on the basis of said inquiry result if transmission of said new operation data is permitted, and permitting transmission of said new operation data to said electronic device only when it is determined that transmission of said new operation data is permitted.

8. A method of providing a user system a new service associated with an electronic device in said user system in accordance with information being communicated through a communication network, between said user system and a customer center for carrying out an operation support business for said electronic device, said electronic device storing communication log information and operation data, executing a predetermined communication process on the basis of the operation data, said method for use in a system comprising: said user system; said customer center being connected said user system through said communication network; a timer being included said customer center; a database for storing therein subscriber information allocated to said electronic device from said communication network, and information indicative of time for acquire said communication log information in association with individual identification information given to said user system in advance, said method comprising:

causing said customer center to compare time information measured by said timer and said information indicative of time for acquiring said communication log information stored in said database;

reading out the subscriber information from said database, when the time information measured by said timer matches the information indicative of time for acquiring said communication log information stored in said database;

causing said customer center to access said electronic device through said communication network on the basis of said subscriber information, said customer center acquires said communication log information stored in said electronic device;

causing said customer center to judge a communication traffic condition on the basis of said communication log information, to generate a judgment result;

causing said customer center to determine a new inside configuration of said electronic device on the basis of said judgment result; and transmitting a configuration information indicative of suggested contents of said inside configuration, from said customer center to said user system through said communication network.

9. A method according to claim 8, wherein transmitting said configuration information includes transmitting access information required to browse said configuration information from said customer center to said user system via said communication network, and transmitting said configuration information to said user system via said communication network on the basis of said access information when said access information is transmitted from said user system that received said access information to said customer center.

10. A method according to claim 8, further comprising:

transmitting a change request which contains selection contents of the inside configuration and subscriber information allocated from said communication network to said electronic device, from said user system to said customer center; and causing said customer center to generate new operation data on the basis of said selection contents contained in said change request received from said user system, and to transmit said new operation data to said electronic device via said communication network on the basis of said subscriber information contained in said change request.

11. A method according to claim 10, further comprising causing said electronic device to rewrite said operation data stored in said electronic device to said new operation data, when said electronic device receives said new operation data from said customer center.

12. A method according to claim 10, wherein transmitting said new operation data includes causing said customer center to transmit said new operation data to said electronic device, when said customer center receives an access information, which is allocated in advance to said user system.

13. A method according to claim 10, wherein said method is applied to a system in which said customer center and a charge settlement institution are adapted to be connected via a communication network, and wherein said method further comprises:

transmitting a user's account identification information from said user system to said customer center; and executing a settlement process for transferring an amount required to provide said new operation data from a user's account between said customer center and said charge settlement institution via said communication network, after said new operation data is transmitted to said electronic device of said user system.

14. A method according to claim 10, wherein said method is applied to a system in which said customer center and a charge settlement institution are adapted to be connected via a communication network, and wherein said method further comprises:

transmitting a user's account identification information from said user system to said customer center;

causing said customer center to inquire of said charge settlement institution about authenticity of the user via said communication network on the basis of received user's account identification information, to generate an inquiry result; and causing said customer center to check on the basis of said inquiry result if transmission of said new operation data is permitted, and permitting transmission of said new operation data to said electronic device only when it is determined that transmission of said new operation data is permitted.

15. A method of providing a user system a new service associated with an electronic device in said user system in accordance with information being communicated through a communication network, between said user system and a customer center for carrying out an operation support business for said electronic device, said electronic device storing communication log information and operation data, executing a predetermined communication process on the basis of said operation data, said method comprising:

causing said customer center to access said electronic device through said communication network at a predetermined interval, to acquire said communication log information and said operation data stored in said electronic device;

causing said customer center to determine a new inside configuration of said electronic device on the basis of said communication log information and said operation data acquired from said electronic device; and transmitting configuration information indicative of suggested contents of said inside configuration, from said customer center to said user system through said communication network.

16. A method according to claim 15, wherein transmitting said configuration information includes transmitting an access information required to browse the configuration information from said customer center to said user system via said communication network, and transmitting said configuration information to said user system via said communication network on the basis of said access information, when the access information is transmitted from said user system that received said access information to said customer center.

17. A method according to claim 15, further comprising:
transmitting a change request which contains selection contents of operation data of said electronic device and subscriber information allocated from said communication network to said electronic device, from said user system to said customer center; and
causing said customer center to generate new operation data on the basis of said operation data acquired from said electronic device and said selection contents contained in said change request received from said user system, and to transmit said new operation data to said electronic device via said communication network on the basis of said subscriber information contained in said change request.

18. A method according to claim 17, further comprising causing said electronic device to rewrite said operation data stored in said electronic device to said new operation data, when said electronic device receives said new operation data from said customer center.

19. A method according to claim 17, wherein transmitting said new operation data includes causing said customer center to transmit said new operation data to said electronic device, when said customer center receives an access information, which is allocated in advance to said user system.

20. A method according to claim 17, wherein said method is applied to a system in which said customer center and a charge settlement institution are adapted to be connected via a communication network, and wherein said method further comprises:
transmitting a user's account identification information from said user system to said customer center; and
executing a settlement process for transferring an amount required to provide said new operation data from a user's account between said customer center and said charge settlement institution via said communication network on the basis of said user's account identification information, after said new operation data is sent to said electronic device of said user system.

21. A method according to claim 17, wherein said method is applied to a system in which said customer center and a charge settlement institution are adapted to be connected via a communication network, and wherein said method further comprises:
transmitting a user's account identification information from said user system to said customer center;
causing said customer center to inquire of said charge settlement institution about authenticity of the user via said communication network on the basis of received user's account identification information, to generate a inquiry result; and
causing said customer center to check on the basis of said inquiry result if transmission of said new operation data is permitted, and permitting transmission of said new operation data to said electronic device only when it is determined that transmission of said new operation data is permitted.

22. A method of providing a user system a new service associated with an electronic device in said user system in accordance with information being communicated through a communication network, between said user system and a customer center for carrying out an operation support business for said electronic device, said electronic device incorporating a plurality of line units which connect different types of lines, said method comprising:
causing said electronic device to calculate use rates for the respective line units, to access said customer center via said communication network when the use rate has exceeded a reference value, and to transmit a setting request to said customer center which contains a unit information indicative of the line unit, the use rate of which has exceeded the reference value, and subscriber information allocated from said communication network to said user system; and
causing said customer center to generate suggestion information required to issue a change or extension request of a unit on the basis of the unit information, and to transmit the suggestion information to said user system on the basis of the subscriber information via said communication network.

23. A method according to claim 22, wherein said method is applied to a system in which said customer center and a work agent are adapted to be connected via a communication network, and wherein said method further comprises:
transmitting the unit change or extension request information from said user system that received said suggestion information to said customer center via said communication network; and
causing said customer center to issue a unit change or extension request of said electronic device of said user system as a request source to said work agent via said communication network on the basis of the request information received from said user system.

24. A method according to claim 22, wherein said method is applied to a system in which said customer center, a parts agent, and a work agent are adapted to be connected via a communication network, and wherein said method further comprises:
transmitting the unit change or extension request information from said user system that received the suggestion information to said customer center via said communication network; and
causing said customer center to issue a unit change or extension request of said electronic device of said user system as a request source to said parts agent and said work agent via said communication network on the basis of the request information received from said user system.

25. A method according to claim 22, wherein said method is applied to a system in which said customer center, a parts agent, a work agent, and a charge settlement institution are adapted to be connected via a communication network, and wherein said method further comprises:
transmitting the unit change or extension request information from said user system that received said suggestion information to said customer center via said communication network;
causing said customer center to execute an estimation process of cost required to change or extend the unit between said parts agent and said work agent via said communication network on the basis of said request information received from said user system;
transmitting the estimated cost information from said customer center to said user system via said communication network;
transmitting account identification information of a user from said user system to said customer center in response to the cost information;

causing said customer center to request said work agent to change or extend the unit of said electronic device of said user system as a request source via said communication network upon receiving said account identification information; and executing a settlement process for transferring an amount required to change or extend the unit from a user's account between said customer center and said charge settlement institution via said communication network upon completion of the change or extension of the unit of said electronic device of said user system.

26. A customer center, which is connected via a communication network to a user system comprising an electronic device that stores communication log information and operation data and executes a predetermined communication process on the basis of the operation data, and which provides a new service associated with said electronic device to said user system in accordance with an information being communicated with said user system, comprising:

acquiring means for periodically accessing said electronic device via said communication network to acquire said communication log information from said electronic device;

judging means for judging a communication traffic condition on the basis of said communication log information, and generating a judgment result;

determining means for determining a new inside configuration of said electronic device on the basis of said judgment result; and transmitting means for transmitting configuration information indicative of suggested contents of said inside configuration to said user system via said communication network.

27. A customer center according to claim 26, wherein said transmitting means transmits access information required to browse said configuration information to said user system, and transmits the configuration information to said user system via said communication network on the basis of the access information being transmitted from said user system.

28. A customer center according to claim 26, further comprising operation data transmitting means for when a change request which contains selection contents of said inside configuration and subscriber information assigned from said communication network to said electronic device is received from said user system, generating new operation data on the basis of the selection contents, and transmitting said new operation data to said electronic device on the basis of said subscriber information.

29. A customer center according to claim 28, wherein said operation data transmitting means transmits said new operation data to said electronic device when access information given in advance to said user system is received from said user system.

30. A customer center according to claim 28, wherein said customer center is applied to a system in which said customer center and a charge settlement institution are adapted to be connected via a communication network, and wherein said customer center further comprises:

account identification information acquiring means for acquiring account identification information of a user from said user system; and settlement process executing means for executing a settlement process for transferring an amount required to provide said new operation data from a user's account between said customer center and said charge settlement institution via said communication network, after said new operation data is sent to said electronic device of said user system.

31. A customer center according to claim 28, wherein said customer center is applied to a system in which said customer center and a charge settlement institution are adapted to be connected via a communication network, and wherein said customer center further comprises:

account identification information acquiring means for acquiring account identification information of a user from said user system;

inquiring means for inquiring of said charge settlement institution about authenticity of the user via said communication network on the basis of said users account identification information; and permitting means for checking on the basis of said inquiry result of said inquiry means if transmission of said new operation data is permitted, and permitting transmission of said new operation data to said electronic device only when it is determined that transmission of said new operation data is permitted.

32. A customer center, which is connected via a communication network to a user system comprising an electronic device that stores communication log information and operation data and executes a predetermined communication process on the basis of the operation data, and which provides a new service associated with said electronic device to said user system in accordance with information being communicated with said user system, comprising:

a timer;

a database for storing subscriber information allocated from said communication network to said electronic device, and information indicative of time for acquiring the communication log information in association with individual identification information given to said user system in advance;

comparing means for comparing time information measured by said timer and the information indicative of the time for acquiring said communication log information stored in said database;

reading out means for reading out said subscriber information from said database, when the time information measured by said timer matches the information indicative of the time for acquiring said communication log information stored in said database match;

acquiring means for accessing said electronic device on the basis of said subscriber information via said communication network to acquire the communication log information from said electronic device;

determining means for determining a new inside configuration of said electronic device on the basis of said communication log information; and transmitting means for transmitting configuration information indicative of suggested contents of inside configuration to said user system via said communication network.

33. A customer center according to claim 32, wherein said transmitting means transmits access information required to browse said configuration information to said user system, transmits the configuration information to said user system on the basis of said access information via said communication network, and where said access information is sent from said user system that received said access information to said customer center via said communication information.

34. A customer center according to claim 32, further comprising operation data transmitting means for, when a change request which contains selection contents of the configuration information and a subscriber information assigned from said communication network to said electronic device is received from said user system, generating a new operation data on the basis of said selection contents contained in the change request, and transmitting the new operation data to said electronic device on the basis of the subscriber information contained in the change request via said communication network.

35. A customer center according to claim 34, wherein said operation data transmitting means transmits said new operation data to said electronic device when access information given in advance to said user system is received from said user system.

36. A customer center according to claim 34, wherein said customer center is applied to a system in which said customer center and a charge settlement institution are adapted to be connected via a communication network, and wherein said customer center further comprises:
   account identification information acquiring means for acquiring account identification information of a user from said user system; and
   settlement process executing means for executing a settlement process for transferring an amount required to provide the new operation data from a users account between said customer center and said charge settlement institution via said communication network after the new operation data is sent to said electronic device of said user system.

37. A customer center according to claim 34, wherein said customer center is applied to a system in which said customer center and a charge settlement institution are adapted to be connected via a communication network, and wherein said customer center further comprises:
   account identification information acquiring means for acquiring account identification information of a user from said user system;
   inquiring means for inquiring of said charge settlement institution about authenticity of the user via said communication network on the basis of the acquired user's account identification information, generating an inquiry result; and
   permitting means for checking on the basis of said inquiry result if transmission of said new operation data is permitted, and permitting transmission of said new operation data to said electronic device only when it is determined that transmission of said new operation data is permitted.

38. A customer center, which is connected via a communication network to a user system comprising an electronic device that stores communication log information and operation data and executes a predetermined communication process on the basis of said operation data, and which provides a new service associated with said electronic device to said user system in accordance with information being communicated with said user system, comprising:
   acquiring means for periodically accessing said electronic device via said communication network to acquire said communication log information and operation data from said electronic device;
   determining means for determining a new inside configuration of said electronic device on the basis of said communication log information and operation data; and
   transmitting means for transmitting configuration information indicative of suggested contents of said inside configuration to said user system via said communication network.

39. A customer center according to claim 38, wherein said transmitting means transmits access information required to browse said configuration information to said user system, and transmits said configuration information to said user system on the basis of said access information via said communication network, when said access information is transmitted from said user system that received said access information to said customer center.

40. A customer center according to claim 38, further comprising operation data transmitting means for, when a change request which contains selection contents of said configuration information and subscriber information assigned from said communication network to said electronic device is received from said user system, generating a new operation data on the basis of the operation data acquired from said electronic device and said selection contents contained in said change request, and transmitting the new operation data to said electronic device on the basis of said subscriber information contained in the change request via said communication network.

41. A customer center according to claim 40, wherein said operation data transmitting means transmits said new operation data to said electronic device when access information given in advance to said user system is received from said user system.

42. A customer center according to claim 40, wherein said customer center is applied to a system in which said customer center and a charge settlement institution are adapted to be connected via a communication network, and wherein said customer center further comprises:
   account identification information acquiring means for acquiring account identification information of a user from said user system; and
   settlement process executing means for executing a settlement process for transferring an amount required to provide said new operation data from a user's account between said customer center and said charge settlement institution via said communication network on the basis of the user's account identification information, after said new operation data is sent to said electronic device of said user system.

43. A customer center according to claim 40, wherein said customer center is applied to a system in which said customer center and a charge settlement institution are adapted to be connected via a communication network, and wherein said customer center further comprises:
   account identification information acquiring means for acquiring account identification information of a user from said user system;
   inquiring means for inquiring of said charge settlement institution about authenticity of the user via said communication network on the basis of the acquired user's account identification information, generating a inquiry result; and
   permitting means for checking on the basis of said inquiry result if transmission of said new operation data is permitted, and permitting transmission of said new operation data to said electronic device only when it is determined that transmission of said new operation data is permitted.

44. A customer center, which is connected via a communication network to a user system comprising an electronic device that incorporates a plurality of line units which connect different types of lines, and which provides a new service associated with said electronic device to said user system in accordance with information being communicated with said user system, comprising:

generating means for, when a setting request which contains a unit information indicative of the line unit, a use rate of which has exceeded a reference value, and subscriber information allocated from said communication network to said user system, is received from said electronic device of said user system, generating a suggestion information required to issue a change or extension request of a unit on the basis of the unit information, and transmitting means for transmitting the suggestion information to said user system on the basis of said subscriber information contained in said setting request via said communication network.

45. A customer center according to claim 44, wherein said customer center is applied to a system in which said customer center and a work agent are adapted to be connected via a communication network, and wherein said customer center further comprises:

issuing means for issuing a line unit change or extension request of said electronic device of said user system as a request source to said work agent via said communication network on the basis of a request information being transmitted from said user system that received said suggestion information.

46. A customer center according to claim 44, wherein said customer center is applied to a system in which said customer center, a parts agent, and a work agent are adapted to be connected via a communication network, and wherein said customer center further comprises:

issuing means for issuing a line unit change or extension request of said electronic device of said user system as a request source to said parts agent and said work agent via said communication network on the basis of a request information being transmitted from said user system that received said suggestion information.

47. A customer center according to claim 44, wherein said customer center is applied to a system in which said customer center, a work agent, and a charge settlement institution are adapted to be connected via a communication network, and wherein said customer center further comprises:

estimation process executing means for executing an estimation process or cost required to change or extend the line unit between said parts agent and said work agent via said communication network on the basis of the request information being transmitted from said user system that received the suggestion information;

cost information transmitting means for transmitting said estimation cost information to said user system via said communication network;

requesting means for requesting said work agent to change or extend the line unit of said electronic device of said user system as a request source via said communication network, in accordance with account identification information of a user being transmitted from said user system in response to said cost information; and settlement process executing means for executing a settlement process for transferring an amount required to change or extend the line unit from a user's account between said customer center and said charge settlement institution via said communication network on the basis of said account identification information, after the line unit of said electronic device of said user system is changed or extended.

48. A user system which is connected to a customer center of claim 26, and which comprises an electronic device that stores communication log information and operation data, and executes a predetermined communication process on the basis of said operation data, comprising:

communication log information transmitting means for reading out the communication log information stored in said electronic device in response to an acquisition request being transmitted from said customer center, and transmitting said communication log information to said customer center; and suggestion information receiving means for receiving information indicative of a new inside configuration of said electronic device from said customer center.

49. A user system which is connected to a customer center of claim 38, and which comprises an electronic device that stores communication log information and operation data, and executes a predetermined communication process on the basis of the operation data, comprising:

communication log information transmitting means for reading out the communication log information and operation data stored in said electronic device in response to an acquisition request being transmitted from said customer center, and transmitting said communication log information and operation data to said customer center; and suggestion information receiving means for receiving information indicative of a new inside configuration of said electronic device from said customer center.

50. A user system according to claim 48 or 49, further comprising:

change request transmitting means for transmitting a change request which contains selection contents of the inside configuration, and subscriber information allocated from said communication network to said electronic device, to said customer center; and operation data receiving means for receiving new operation data from said customer center.

51. A user system which comprises a plurality of line units which connect different types of lines, and which is connected to a customer center via a communication network, comprising:

calculating means for calculating use rates of the respective line units in said electronic device;

setting request transmitting means for accessing said customer center via said communication network to transmit a setting request that contains information indicative of the line unit, the use rate of which has exceeded the reference value, and subscriber information allocated from said communication network to said user system, in response to the use rate being exceeded a reference value; and suggestion information receiving means for receiving suggestion information, which is generated by said customer center on the basis of said unit information that is contained in said setting request and indicates the line unit, and is required to change or extend a line unit.

52. A customer center, which is connected via a communication network to a user system comprising an electronic device that stores communication log information and operation data and executes a predetermined communication process on the basis of the operation data, and which provides a new service associated with said electronic device to said user system in accordance with information being communicated with said user system, comprising:

an acquiring section which periodically access said electronic device via said communication network to acquire said communication log information from said electronic device;

a judging section which judges a communication traffic condition on the basis of said communication log information, generating a judgment result;

a determining section which determines a new inside configuration of said electronic device on the basis of said judgment result; and a transmitting section which transmits configuration information indicative of suggested contents of said inside configuration to said user system via said communication network.

53. A customer center according to claim 52, wherein said transmitting section transmits access information required to browse said configuration information to said user system, and transmits said configuration information to said user system via said communication network on the basis of said access information being transmitted from said user system.

54. A customer center according to claim 52, further comprising a operation data transmitting section which, when a change request which contains selection contents of said inside configuration and subscriber information assigned from said communication network to said electronic device is received from said user system, generates new operation data on the basis of the selection contents, and transmits said new operation data to said electronic device on the basis of said subscriber information.

55. A customer center according to claim 54, wherein said operation data transmitting section transmits said new operation data to said electronic device when access information given in advance to said user system is received from said user system.

56. A customer center according to claim 54, wherein said customer center is applied to a system in which said customer center and a charge settlement institution are adapted to be connected via a communication network, and wherein said customer center further comprises:

an account identification information acquiring section which acquires account identification information of a user from said user system; and a settlement process executing section which executes a settlement process for transferring an amount required to provide said new operation data from a user's account between said customer center and said charge settlement institution via said communication network, after said new operation data is sent to said electronic device of said user system.

57. A customer center according to claim 54, wherein said customer center is applied to a system in which said customer center and a charge settlement institution are adapted to be connected via a communication network, and wherein said customer center further comprises:

an account identification information acquiring section which acquires account identification information of a user from said user system;

an inquiring section which inquiries of said charge settlement institution about authenticity of the user via said communication network on the basis of the acquired user's account identification information, generates a inquiry result; and a permitting section which checks on the basis of said inquiry result if transmission of the new operation data is permitted, and permitting transmission of said new operation data to said electronic device only when it is determined that transmission of said new operation data is permitted.

58. A customer center, which is connected via a communication network to a user system comprising an electronic device that stores communication log information and operation data and executes a predetermined communication process on the basis of said operation data, and which provides a new service associated with said electronic device to said user system in accordance with information being communicated with said user system, comprising:

a timer;

a database for storing subscriber information allocated from said communication network to said electronic device, and information indicative of time for acquiring said communication log information in association with individual identification information given to said user system in advance;

a comparing section which compares time information measured by said timer and the information indicative of the time for acquiring said communication log information stored in said database;

a read-out unit which reads out said subscriber information from said database, when the time information measured by said timer matches the information indicative of the time for acquiring said communication log information stored in said database match;

an acquiring section which accesses said electronic device on the basis of said subscriber information via said communication network to acquire said communication log information from said electronic device;

a determining section which determines a new inside configuration of said electronic device on the basis of said communication log information; and a transmitting section which transmits configuration information indicative of suggested contents of said inside configuration to said user system via said communication network.

59. A customer center according to claim 58, further comprising an operation data transmitting section which, when a change request which contains selection contents of the configuration information and a subscriber information assigned from said communication network to said electronic device is received from said user system, generates a new operation data on the basis of said selection contents contained in the change request, and transmits said new operation data to said electronic device on the basis of said subscriber information contained in said change request via said communication network.

60. A customer center according to claim 59, wherein said operation data transmitting section transmits said new operation data to said electronic device when access information given in advance to said user system is received from said user system.

61. A customer center according to claim 59, wherein said customer center is applied to a system in which said customer center and a charge settlement institution are adapted to be connected via a communication network, and wherein said customer center further comprises:

an account identification information acquiring section which acquires account identification information of a user from said user system; and a settlement process executing section which executes a settlement process for transferring an amount required to provide said new operation data from a user's account between said customer center and said charge settlement institution via said communication network after said new operation data is sent to said electronic device of said user system.

62. A customer center according to claim 59, wherein said customer center is applied to a system in which said customer center and a charge settlement institution are adapted to be connected via a communication network, and wherein said customer center further comprises:

an account identification information acquiring section which acquires account identification information of a user from said user system;

an inquiring section which inquiries of said charge settlement institution about authenticity of the user via said communication network on the basis of the acquired user's account identification information, generates an inquiry result; and a permitting section which checks on the basis of said inquiry result if transmission of the new operation data is permitted, and permits transmission of said new operation data to said electronic device only when it is determined that transmission of said new operation data is permitted.

63. A customer center, which is connected via a communication network to a user system comprising an electronic device that stores communication log information and operation data and executes a predetermined communication process on the basis of the operation data, and which provides a new service associated with said electronic device to said user system in accordance with information being communicated with said user system, comprising:

an acquiring section which periodically accesses said electronic device via said communication network to acquire said communication log information and operation data from said electronic device;

a determining section which determines a new inside configuration of said electronic device on the basis of said communication log information and operation data; and a transmitting section which transmits configuration information indicative of suggested contents of said inside configuration to said user system via said communication network.

64. A customer center according to claim 63, wherein said transmitting section transmits access information required to browse said configuration information to said user system, and transmits the configuration information to said user system on the basis of said access information via said communication network, when the access information is transmitted from said user system that received said access information to said customer center.

65. A customer center according to claim 63, further comprising an operation data transmitting section which, when a change request which contains selection contents of the configuration information and subscriber information assigned from said communication network to said electronic device is received from said user system, generates a new operation data on the basis of said operation data acquired from said electronic device and said selection contents contained in the change request, and transmits said new operation data to said electronic device on the basis of said subscriber information contained in said change request via said communication network.

66. A customer center according to claim 65, wherein said operation data transmitting section transmits said new operation data to said electronic device when access information given in advance to said user system is received from said user system.

67. A customer center according to claim 65, wherein said customer center is applied to a system in which said customer center and a charge settlement institution are adapted to be connected via a communication network, and wherein said customer center further comprises:

an account identification information acquiring section which acquires account identification information of a user from said user system; and a settlement process executing section which executes a settlement process for transferring an amount required to provide the new operation data from a user's account between said customer center and said charge settlement institution via said communication network on the basis of said user's account identification information, after said new operation data is sent to said electronic device of said user system.

68. A customer center according to claim 65, wherein said customer center is applied to a system in which said customer center and a charge settlement institution are adapted to be connected via a communication network, and wherein said customer center further comprises:

an account identification information acquiring section which acquires account identification information of a user from said user system;

an inquiring section which inquires of said charge settlement institution about authenticity of the user via said communication network on the basis of the acquired users account identification information, generating a inquiry result; and a permitting section which checks on the basis of said inquiry result if transmission of the new operation data is permitted, and permits transmission of the new operation data to said electronic device only when it is determined that transmission of said new operation data is permitted.

69. A customer center, which is connected via a communication network to a user system comprising an electronic device that incorporates a plurality of line units which connect different types of lines, and which provides a new service associated with said electronic device to said user system in accordance with information being communicated with said user system, comprising:

a generating section which, when a setting request which contains a unit information indicative of the line unit, a use rate of which has exceeded a reference value, and subscriber information allocated from said communication network to said user system, is received from said electronic device of said user system, generates a suggestion information required to issue a change or extension request of a unit on the basis of said unit information, and a transmitting section which transmits the suggestion information to said user system on the basis of the subscriber information contained in the setting request via said communication network.

70. A customer center according to claim 69, wherein said customer center is applied to a system in which said customer center and a work agent are adapted to be connected via a communication network, and wherein said customer center further comprises:

an issuing section which issues a line unit change or extension request of said electronic device of said user system as a request source to said work agent via said communication network on the basis of a request information being transmitted from said user system that received said suggestion information.

71. A customer center according to claim 69, wherein said customer center is applied to a system in which said customer center, a parts agent, and a work agent are adapted to be connected via a communication network, and wherein said customer center further comprises:

an issuing section which issues a line unit change or extension request at said electronic device of said user system as a request source to said parts agent and said work agent via said communication network on the basis of a request information being transmitted from said user system that received said suggestion information.

72. A customer center according to claim 69, wherein said customer center is applied to a system in which said customer center, a work agent, and a charge settlement institution are adapted to be connected via a communication network, and wherein said customer center further comprises:

an estimation process executing section which executes an estimation process of cost required to change or extend the line unit between said parts agent and said work agent via said communication network on the basis of said request information being transmitted from said user system that received said suggestion information;

a cost information transmitting section which transmits the estimation cost information to said user system via said communication network;

a requesting section which requests said work agent to change or extend the line unit of said electronic device of said user system as a request source via said communication network, in accordance with account identification information of a user being transmitted from said user system in response to said cost information; and a settlement process executing section which executes a settlement process for transferring an amount required to change or extend the line unit from a user's account between said customer center and said charge settlement institution via said communication network on the basis of said account identification information, after the line unit of said electronic device of said user system is changed or extended.

73. A user system which is connected to a customer center of claim 52, and comprises an electronic device that stores communication log information and operation data, and executes a predetermined communication process on the basis of said operation data, comprising:

a communication log information transmitting section which reads out said communication log information stored in said electronic device in response to an acquisition request being transmitted from said customer center, and transmitting said communication log information to said customer center; and a suggestion information receiving section which receives information indicative of a new inside configuration of said electronic device from said customer center.

74. A user system which is connected to a customer center of claim 64, and comprises an electronic device that stores communication log information and operation data, and executes a predetermined communication process on the basis of the operation data, comprising:

a communication log information transmitting section which reads out said communication log information and operation data stored in said electronic device in response to an acquisition request being transmitted from said customer center, and transmits said communication log information and operation data to said customer center; and a suggestion information receiving section which receives information indicative of a new inside configuration of said electronic device from said customer center.

75. A user system according to claim 73 or 74, further comprising:

a change request transmitting section which transmits a change request which contains selection contents of said inside configuration, and subscriber information allocated from said communication network to said electronic device, to said customer center; and an operation data receiving section which receives a new operation data from said customer center.

76. A user system which comprises a plurality of line units which connect different types of lines, and is connected to a customer center via a communication network, comprising:

a calculating section which calculates use rates of the respective line units in said electronic device;

a setting request transmitting section which accesses said customer center via said communication network to transmit a setting request that contains information indicative of the line unit, the use rate of which has exceeded the reference value, and subscriber information allocated from said communication network to said user system, in response to the use rate being exceeded a reference value; and a suggestion information receiving section which receives suggestion information, which is generated by said customer center on the basis of the unit information that is contained in the setting request and indicates the line unit, and is required to change or extend a line unit.

* * * * *

UNITED STATES PATENT AND TRADEMARK OFFICE
CERTIFICATE OF CORRECTION

PATENT NO. : 6,876,732 B2
DATED : April 5, 2005
INVENTOR(S) : Ebisawa et al.

It is certified that error appears in the above-identified patent and that said Letters Patent is hereby corrected as shown below:

<u>Title page,</u>
Item [57], ABSTRACT,
Line 2, change "an user" to -- a user --.

<u>Column 18,</u>
Line 30, change "wherein said", to -- wherein --.
Line 61, change "a inquiry" to -- an inquiry --.

<u>Column 19,</u>
Lines 10-11, change "connected said" to -- connected to said --.
Line 12, change "included said" to -- included in said --.
Line 15, change "for acquire" to -- for acquiring --.

<u>Column 21,</u>
Lines 57-58, change "a inquiry" to -- an inquiry --.

<u>Column 24,</u>
Line 13, change "users" to -- user's --.

<u>Column 25,</u>
Line 24, change "users" to -- user's --.

<u>Column 26,</u>
Line 53, change "a inquiry" to -- an inquiry --.

<u>Column 28,</u>
Line 66, change "access" to -- accesses --.

UNITED STATES PATENT AND TRADEMARK OFFICE
CERTIFICATE OF CORRECTION

PATENT NO. : 6,876,732 B2
DATED : April 5, 2005
INVENTOR(S) : Ebisawa et al.

It is certified that error appears in the above-identified patent and that said Letters Patent is hereby corrected as shown below:

Column 29,
Line 20, change "a operation" to -- an operation --.
Lines 60-61, change "a inquiry" to -- an inquiry --.

Column 32,
Line 27, change "users" to -- user's --.
Lines 27-28, change "a inquiry" to -- an inquiry --.

Column 33,
Line 5, change "request at" to -- request of --.

Signed and Sealed this

Twenty-fifth Day of April, 2006

JON W. DUDAS
*Director of the United States Patent and Trademark Office*